United States Patent
Saito

(10) Patent No.: US 12,517,686 B2
(45) Date of Patent: Jan. 6, 2026

(54) IMAGE FORMING APPARATUS, CONTROL METHOD OF THE IMAGE FORMING APPARATUS, AND COMPUTER-READABLE STORAGE MEDIUM

(71) Applicant: CANON KABUSHIKI KAISHA, Tokyo (JP)

(72) Inventor: Sho Saito, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/341,663

(22) Filed: Jun. 26, 2023

(65) Prior Publication Data
US 2023/0333791 A1    Oct. 19, 2023

Related U.S. Application Data

(63) Continuation of application No. 16/371,628, filed on Apr. 1, 2019.

(30) Foreign Application Priority Data

Apr. 13, 2018    (JP) .................................. 2018-077924

(51) Int. Cl.
 *G06F 3/12*    (2006.01)
 *H04N 1/44*    (2006.01)

(52) U.S. Cl.
 CPC .......... *G06F 3/1255* (2013.01); *G06F 3/1208* (2013.01); *G06F 3/1228* (2013.01); *G06F 3/1288* (2013.01); *H04N 1/4433* (2013.01)

(58) Field of Classification Search
 None
 See application file for complete search history.

(56) References Cited

U.S. PATENT DOCUMENTS

| | | | |
|---|---|---|---|
| 2009/0021757 A1 * | 1/2009 | Liu ..................... | G06F 3/1259 |
| | | | 358/1.13 |
| 2011/0032569 A1 | 2/2011 | Ohashi | |
| 2012/0050797 A1 | 3/2012 | Tamura | |
| 2014/0022579 A1 * | 1/2014 | Edamatsu .......... | G06K 15/1805 |
| | | | 358/1.13 |
| 2016/0295057 A1 | 10/2016 | Miyake | |
| 2019/0095192 A1 * | 3/2019 | Akita ................... | G06F 3/1204 |

FOREIGN PATENT DOCUMENTS

CN    106717016 A    5/2017

* cited by examiner

*Primary Examiner* — Fan Zhang
(74) *Attorney, Agent, or Firm* — Canon U.S.A., Inc. IP Division

(57) ABSTRACT

An image forming apparatus to communicate with an information processing apparatus includes a reception unit and a transmission unit. The reception unit receives information for identifying a print service included in the information processing apparatus. The transmission unit transmits, to the information processing apparatus, a prohibition condition. The prohibition condition represents a condition relating to a print setting that cannot be set depending on capabilities of a printing apparatus and of the print setting. The prohibition condition is for a print service corresponding to the information received by the reception unit.

8 Claims, 37 Drawing Sheets

FIG.5

```
"Hypertext Transfer Protocol"
POST /ipp/print HTTP/1.1/
Content-Length: XXX
Content-Type: application/ipp         503
Host: CononXXXX.local:631
User-Agent: CUPS/2.2.3 (IPP Print Service1)
Expect: 100-continue "Internet Printing Protocol"
Request = (
  operation-id: Get-Printer-Attributes operation-attributes-tag = {
    "attributes-charset" = "utf-8";
    "attributes-natural-language" = ja-jp;
    "printer-uri" = "ipp://xxxx.local:631/ipp/print";
    "requested-attributes(keyword): 'job-constraints-supported', "
  }
)
```
~501

```
"Hypertext Transfer Protocol"
HTTP/1.1 200 OK
Server: CONON HTTP Server
Content-Length: XXX
Content-Type: application/ipp
Connection: close "Internet Printing Protocol"
Request = (
  operation-attributes-tag = {
    "attributes-charset" = "utf-8";
    "attributes-natural-language" = ja-jp;
  },
  printer-attributes-tag {
    job-constraints-supported = {   ~504
      resolver-name = "rule01"
      sides = {
        "two-sided-long-edge"
        "two-sided-short-edge"
      }
      media-col = {
        media-size = "iso_a5_148x210mm"
      }
    }
    end-of-attribute-tag
  }
)
```
~502

FIG. 9A

| A | B | C | D | SHEET TYPE | | | |
|---|---|---|---|---|---|---|---|
| MANAGEMENT NUMBER | NUMBER OF PROHIBITION ITEMS (BY CONDITION) | RULE DESCRIPTION | ANY | PLAIN PAPER 1 | PLAIN PAPER 2 | PLAIN PAPER 3 | THICK PAPER |
| 1 | 2 | A5 SHEET IS NOT AVAILABLE FOR TWO-SIDED PRINT | F | F | F | F | F |
| 2 | 2 | THICK PAPER IS NOT AVAILABLE FOR TWO-SIDED PRINT | F | F | F | F | T |
| 3 | 2 | PLAIN PAPER 3 IS NOT AVAILABLE FOR TWO-SIDED PRINT | F | F | F | T | F |
| 4 | 2 | NO PUNCHING AT ARBITRARY POSITION OF A5 PAPER | F | F | F | F | F |
| 5 | 2 | NO PUNCHING ON LEFT SIDE OF A5 PAPER | F | F | F | F | F |
| 6 | 2 | NO PUNCHING AT BOTTOM OF A5 PAPER | F | F | F | F | F |
| 7 | 2 | NO PUNCHING ON RIGHT SIDE OF A5 PAPER | F | F | F | F | F |
| 8 | 2 | NO PUNCHING AT TOP OF A5 PAPER | F | F | F | F | F |
| 9 | 2 | NO STAPLING AT ARBITRARY POSITION OF A5 PAPER | F | F | F | F | F |
| 10 | 2 | NO STAPLING ON LEFT SIDE OF A5 PAPER | F | F | F | F | F |
| 11 | 2 | NO STAPLING AT BOTTOM OF A5 PAPER | F | F | F | F | F |
| 12 | 2 | NO STAPLING ON RIGHT SIDE OF A5 PAPER | F | F | F | F | F |
| 13 | 2 | NO STAPLING AT TOP OF A5 PAPER | F | F | F | F | F |
| 14 | 2 | NO STAPLING AT UPPER LEFT POSITION OF A5 PAPER | F | F | F | F | F |
| 15 | 2 | NO STAPLING AT LOWER LEFT POSITION OF A5 PAPER | F | F | F | F | F |
| 16 | 2 | NO STAPLING AT LOWER RIGHT POSITION OF A5 PAPER | F | F | F | F | F |
| 17 | 2 | NO STAPLING AT UPPER RIGHT POSITION OF A5 PAPER | F | F | F | F | F |
| 18 | 2 | NO STAPLING AT ARBITRARY POSITION OF THICK PAPER | F | F | F | F | F |
| 19 | 2 | NO STAPLING ON LEFT SIDE OF THICK PAPER | F | F | F | F | F |
| 20 | 2 | NO STAPLING AT BOTTOM OF THICK PAPER | F | F | F | F | F |
| 21 | 2 | NO STAPLING ON RIGHT SIDE OF THICK PAPER | F | F | F | F | F |
| 22 | 2 | NO STAPLING AT TOP OF THICK PAPER | F | F | F | F | F |
| 23 | 2 | NO STAPLING AT UPPER LEFT POSITION OF THICK PAPER | F | F | F | F | F |
| 24 | 2 | NO STAPLING AT LOWER LEFT POSITION OF THICK PAPER | F | F | F | F | F |
| 25 | 2 | NO STAPLING AT LOWER RIGHT POSITION OF THICK PAPER | F | F | F | F | F |
| 26 | 2 | NO STAPLING AT UPPER RIGHT POSITION OF THICK PAPER | F | F | F | F | F |
| 27 | 3 | NO STAPLING ON LEFT SIDE OF A3 PLAIN PAPER 1 | F | F | F | F | F |
| 28 | 3 | NO STAPLING ON RIGHT SIDE OF A3 PLAIN PAPER 1 | F | F | F | F | F |
| 29 | 3 | NO STAPLING ON LEFT SIDE OF A3 PLAIN PAPER 2 | F | F | F | F | F |
| 30 | 3 | NO STAPLING ON RIGHT SIDE OF A3 PLAIN PAPER 2 | F | F | F | F | F |
| 31 | 3 | NO STAPLING ON LEFT SIDE OF A3 PLAIN PAPER 3 | F | F | F | F | F |
| 32 | 3 | NO STAPLING ON RIGHT SIDE OF A3 PLAIN PAPER 3 | F | F | F | F | F |
| 33 | 2 | NO PUNCHING ON LEFT SIDE OF A3 PAPER | F | F | F | F | F |
| 34 | 2 | NO PUNCHING ON RIGHT SIDE OF A3 PAPER | F | F | F | F | F |
| 35 | 2 | PLAIN PAPER 1 IS NOT AVAILABLE FOR COVER SHEET | F | T | F | F | F |

| A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|
| | | SHEET TYPE | | | | | SHEET SIZE | | | STAPLING | | | | | | | | | PUNCHING (TWO HOLES) | | | | | TWO-SIDED | COVER SHEET |
| FUNCTION LIST | ANY | PLAIN PAPER 1 | PLAIN PAPER 2 | PLAIN PAPER 3 | PLAIN PAPER | THICK PAPER | A5 | A4 | A3 | ANY | LEFT | BOTTOM | RIGHT | TOP | UPPER LEFT | LOWER LEFT | LOWER RIGHT | UPPER RIGHT | ANY | LEFT | BOTTOM | RIGHT | TOP | | |
| PRINTER | ○ | ○ | ○ | ○ | — | ○ | ○ | ○ | ○ | ○ | ○ | ○ | ○ | ○ | ○ | ○ | ○ | ○ | ○ | ○ | ○ | ○ | ○ | ○ | ○ |
| IPP PRINT SERVICE 1 | ○ | × | × | × | × | × | ○ | ○ | × | ○ | ○ | ○ | ○ | ○ | ○ | ○ | ○ | ○ | ○ | ○ | ○ | ○ | ○ | ○ | ○ |
| IPP PRINT SERVICE 2 | ○ | — | — | — | ○ | ○ | ○ | ○ | ○ | ○ | ○ | ○ | ○ | ○ | ○ | ○ | ○ | ○ | ○ | ○ | ○ | ○ | ○ | ○ | ○ |
| IPP PRINT SERVICE 3 | ○ | — | — | — | ○ | ○ | ○ | ○ | ○ | ○ | ○ | ○ | ○ | ○ | ○ | ○ | ○ | ○ | × | × | × | × | × | ○ | ○ |
| IPP PRINT SERVICE 4 | ○ | — | — | — | ○ | ○ | ○ | ○ | ○ | × | × | × | × | × | × | × | × | × | ○ | ○ | ○ | ○ | ○ | ○ | ○ |

FIG. 11A

| FUNCTION LIST | SHEET TYPE | | | | SHEET SIZE | | | STAPLING | | | | | | | PUNCHING (TWO HOLES) | | | | | TWO-SIDED | COVER SHEET |
|---|---|---|---|---|---|---|---|---|---|---|---|---|---|---|---|---|---|---|---|---|---|
| | ANY | PLAIN PAPER 1 | PLAIN PAPER 2 | PLAIN PAPER 3 | THICK PAPER | A5 | A4 | A3 | ANY | LEFT | BOTTOM | RIGHT | TOP | UPPER LEFT | LOWER LEFT | LOWER RIGHT | UPPER RIGHT | ANY | LEFT | BOTTOM | RIGHT | TOP | | |
| IPP PRINT SERVICE 1 | ○ | × | × | × | × | ○ | ○ | × | ○ | ○ | ○ | ○ | ○ | ○ | ○ | ○ | ○ | ○ | ○ | ○ | ○ | ○ | ○ | ○ |

FIG.11B1

| A | B | C | D | E | F | G | H |
|---|---|---|---|---|---|---|---|
| | | | | | SHEET TYPE | | |
| MANAGEMENT NUMBER | NUMBER OF PROHIBITION ITEMS (BY CONDITION) | RULE DESCRIPTION | ANY | PLAIN PAPER 1 | PLAIN PAPER 2 | PLAIN PAPER 3 | THICK PAPER |
| 1 | 2 | A5 SHEET IS NOT AVAILABLE FOR TWO-SIDED PRINT | | | | | T |
| 2 | 2 | THICK PAPER IS NOT AVAILABLE FOR TWO-SIDED PRINT | | | | | T |
| 3 | 2 | PLAIN PAPER 3 IS NOT AVAILABLE FOR TWO-SIDED PRINT | | | | T | |
| 4 | 2 | NO PUNCHING AT ARBITRARY POSITION OF A5 PAPER | | | | | |
| 5 | 2 | NO PUNCHING ON LEFT SIDE OF A5 PAPER | | | | | |
| 6 | 2 | NO PUNCHING AT BOTTOM OF A5 PAPER | | | | | |
| 7 | 2 | NO PUNCHING ON RIGHT SIDE OF A5 PAPER | | | | | |
| 8 | 2 | NO PUNCHING AT TOP OF A5 PAPER | | | | | |
| 9 | 2 | NO STAPLING AT ARBITRARY POSITION OF A5 PAPER | | | | | |
| 10 | 2 | NO STAPLING ON LEFT SIDE OF A5 PAPER | | | | | |
| 11 | 2 | NO STAPLING AT BOTTOM OF A5 PAPER | | | | | |
| 12 | 2 | NO STAPLING ON RIGHT SIDE OF A5 PAPER | | | | | |
| 13 | 2 | NO STAPLING AT TOP OF A5 PAPER | | | | | |
| 14 | 2 | NO STAPLING AT UPPER LEFT POSITION OF A5 PAPER | | | | | |
| 15 | 2 | NO STAPLING AT LOWER LEFT POSITION OF A5 PAPER | | | | | |
| 16 | 2 | NO STAPLING AT LOWER RIGHT POSITION OF A5 PAPER | | | | | |
| 17 | 2 | NO STAPLING AT UPPER RIGHT POSITION OF A5 PAPER | | | | | |
| 18 | 2 | NO STAPLING AT ARBITRARY POSITION OF THICK PAPER | | | | | T |
| 19 | 2 | NO STAPLING ON LEFT SIDE OF THICK PAPER | | | | | T |
| 20 | 2 | NO STAPLING AT BOTTOM OF THICK PAPER | | | | | T |
| 21 | 2 | NO STAPLING ON RIGHT SIDE OF THICK PAPER | | | | | T |
| 22 | 2 | NO STAPLING AT TOP OF THICK PAPER | | | | | T |
| 23 | 2 | NO STAPLING AT UPPER LEFT POSITION OF THICK PAPER | | | | | T |
| 24 | 2 | NO STAPLING AT LOWER LEFT POSITION OF THICK PAPER | | | | | T |
| 25 | 2 | NO STAPLING AT LOWER RIGHT POSITION OF THICK PAPER | | | | | T |
| 26 | 2 | NO STAPLING AT UPPER RIGHT POSITION OF THICK PAPER | | | | | T |
| 27 | 3 | NO STAPLING AT TOP OF LEFT SIDE OF A3 PLAIN PAPER 1 | | T | | | |
| 28 | 3 | NO STAPLING ON RIGHT SIDE OF A3 PLAIN PAPER 1 | | T | | | |
| 29 | 3 | NO STAPLING ON LEFT SIDE OF A3 PLAIN PAPER 2 | | | T | | |
| 30 | 3 | NO STAPLING ON RIGHT SIDE OF A3 PLAIN PAPER 2 | | | T | | |
| 31 | 3 | NO STAPLING ON LEFT SIDE OF A3 PLAIN PAPER 3 | | | | T | |
| 32 | 3 | NO STAPLING ON RIGHT SIDE OF A3 PLAIN PAPER 3 | | | | T | |
| 33 | 2 | NO PUNCHING ON LEFT SIDE OF A3 PAPER | | | | | |
| 34 | 2 | NO PUNCHING ON RIGHT SIDE OF A3 PAPER | | | | | |
| 35 | 2 | PLAIN PAPER 1 IS NOT AVAILABLE FOR COVER SHEET | | T | | | |

FIG.11B2

| | I | J | K | L | M | N | O | P | Q | R | S | T | U | V | W | X | Y | Z | AA |
|---|---|---|---|---|---|---|---|---|---|---|---|---|---|---|---|---|---|---|---|
| | SHEET SIZE | | | | STAPLING | | | | | | | PUNCHING (TWO HOLES) | | | | | TWO-SIDED | COVER SHEET |
| | A5 | A4 | A3 | ANY | LEFT | BOTTOM | RIGHT | TOP | UPPER LEFT | LOWER LEFT | LOWER RIGHT | UPPER RIGHT | ANY | LEFT | BOTTOM | RIGHT | TOP | | |

FIG. 11C1

| A | B | C | D | E | F | G | H |
|---|---|---|---|---|---|---|---|
| | | | | | SHEET TYPE | | |
| MANAGEMENT NUMBER | NUMBER OF PROHIBITION ITEMS (BY CONDITION) | RULE DESCRIPTION | ANY | PLAIN PAPER 1 | PLAIN PAPER 2 | PLAIN PAPER 3 | THICK PAPER |
| 1 | 2 | A5 SHEET IS NOT AVAILABLE FOR TWO-SIDED PRINT | | | | | |
| 4 | 2 | NO PUNCHING AT ARBITRARY POSITION OF A5 PAPER | | | | | |
| 5 | 2 | NO PUNCHING ON LEFT SIDE OF A5 PAPER | | | | | |
| 6 | 2 | NO PUNCHING AT BOTTOM OF A5 PAPER | | | | | |
| 7 | 2 | NO PUNCHING ON RIGHT SIDE OF A5 PAPER | | | | | |
| 8 | 2 | NO PUNCHING AT TOP OF A5 PAPER | | | | | |
| 9 | 2 | NO STAPLING AT ARBITRARY POSITION OF A5 PAPER | | | | | |
| 10 | 2 | NO STAPLING ON LEFT SIDE OF A5 PAPER | | | | | |
| 11 | 2 | NO STAPLING AT BOTTOM OF A5 PAPER | | | | | |
| 12 | 2 | NO STAPLING ON RIGHT SIDE OF A5 PAPER | | | | | |
| 13 | 2 | NO STAPLING AT TOP OF A5 PAPER | | | | | |
| 14 | 2 | NO STAPLING AT UPPER LEFT POSITION OF A5 PAPER | | | | | |
| 15 | 2 | NO STAPLING AT LOWER LEFT POSITION OF A5 PAPER | | | | | |
| 16 | 2 | NO STAPLING AT LOWER RIGHT POSITION OF A5 PAPER | | | | | |
| 17 | 2 | NO STAPLING AT UPPER RIGHT POSITION OF A5 PAPER | | | | | |

FIG. 11C2

| SHEET SIZE | | | STAPLING | | | | | | | | | PUNCHING (TWO HOLES) | | | | | TWO-SIDED | COVER SHEET |
|---|---|---|---|---|---|---|---|---|---|---|---|---|---|---|---|---|---|---|
| I | J | K | L | M | N | O | P | Q | R | S | T | U | V | W | X | Y | Z | AA |
| | A4 | A3 | ANY | LEFT | BOTTOM | RIGHT | TOP | UPPER LEFT | LOWER LEFT | LOWER RIGHT | UPPER RIGHT | ANY | LEFT | BOTTOM | RIGHT | TOP | | |
| A4 | | | | | | | | | | | | | | | | | T | |
| A3 | | | | | | | | | | | T | | | | | | | |
| | | | | | | | | | | T | | | | | | | | |
| | | | | | | | | | T | | | | | | | | | |
| | | | | | | | | T | | | | | | | | | | |
| | | | | | | | T | | | | | | | | | | | |
| | | | | | | T | | | | | | | | | | | | |
| | | | | | T | | | | | | | | | | | | | |
| | | | | T | | | | | | | | | | | | | | |
| | | | T | | | | | | | | | | | | | | | |
| | | | | | | | | | | | | T | | | | | | |
| | | | | | | | | | | | | | T | | | | | |
| | | | | | | | | | | | | | | T | | | | |
| | | | | | | | | | | | | | | | T | | | |
| | | | | | | | | | | | | | | | | T | | |
| A5 | T | T | T | T | T | T | T | T | T | T | T | T | T | T | T | T | T | T |

FIG.12

| IPP SHEET TYPE | ANY | PLAIN PAPER | | | THICK PAPER |
|---|---|---|---|---|---|
| MAIN BODY SHEET TYPE | ANY | PLAIN PAPER 1 | PLAIN PAPER 2 | PLAIN PAPER 3 | THICK PAPER |

FIG. 13A

| FUNCTION LIST | SHEET TYPE | | | | | SHEET SIZE | | | | STAPLING | | | | | | | | | PUNCHING (TWO HOLES) | | | | TWO-SIDED | COVER SHEET |
|---|---|---|---|---|---|---|---|---|---|---|---|---|---|---|---|---|---|---|---|---|---|---|---|---|
| | ANY | PLAIN PAPER 1 | PLAIN PAPER 2 | PLAIN PAPER 3 | THICK PAPER | A5 | A4 | A3 | ANY | LEFT | BOTTOM | RIGHT | TOP | UPPER LEFT | LOWER LEFT | LOWER RIGHT | UPPER RIGHT | ANY | LEFT | BOTTOM | RIGHT | TOP | | |
| IPP PRINT SERVICE 2 | O | — | — | — | O | O | O | O | O | O | O | O | O | O | O | O | O | O | O | O | O | O | O | O |

FIG. 13B1

| A | B | C | D | E | F | G | H |
|---|---|---|---|---|---|---|---|
| | | | | | SHEET TYPE | | |
| MANAGEMENT NUMBER | NUMBER OF PROHIBITION ITEMS (BY CONDITION) | RULE DESCRIPTION | ANY | PLAIN PAPER | | | THICK PAPER |
| 1 | 2 | A5 SHEET IS NOT AVAILABLE FOR TWO-SIDED PRINT | | | | | |
| 2 | 2 | THICK PAPER IS NOT AVAILABLE FOR TWO-SIDED PRINT | | | | | T |
| 3 | 2 | PLAIN PAPER 3 IS NOT AVAILABLE FOR TWO-SIDED PRINT | | | | | |
| 4 | 2 | NO PUNCHING AT ARBITRARY POSITION OF A5 PAPER | | | | | |
| 5 | 2 | NO PUNCHING ON LEFT SIDE OF A5 PAPER | | | | | |
| 6 | 2 | NO PUNCHING AT BOTTOM OF A5 PAPER | | | | | |
| 7 | 2 | NO PUNCHING ON RIGHT SIDE OF A5 PAPER | | | | | |
| 8 | 2 | NO PUNCHING AT TOP OF A5 PAPER | | | | | |
| 9 | 2 | NO STAPLING AT ARBITRARY POSITION OF A5 PAPER | | | | | |
| 10 | 2 | NO STAPLING ON LEFT SIDE OF A5 PAPER | | | | | |
| 11 | 2 | NO STAPLING AT BOTTOM OF A5 PAPER | | | | | |
| 12 | 2 | NO STAPLING ON RIGHT SIDE OF A5 PAPER | | | | | |
| 13 | 2 | NO STAPLING AT TOP OF A5 PAPER | | | | | |
| 14 | 2 | NO STAPLING AT UPPER LEFT POSITION OF A5 PAPER | | | | | |
| 15 | 2 | NO STAPLING AT LOWER LEFT POSITION OF A5 PAPER | | | | | |
| 16 | 2 | NO STAPLING AT LOWER RIGHT POSITION OF A5 PAPER | | | | | |
| 17 | 2 | NO STAPLING AT UPPER RIGHT POSITION OF A5 PAPER | | | | | |
| 18 | 2 | NO STAPLING AT ARBITRARY POSITION OF THICK PAPER | | | | | T |
| 19 | 2 | NO STAPLING ON LEFT SIDE OF THICK PAPER | | | | | T |
| 20 | 2 | NO STAPLING AT BOTTOM OF THICK PAPER | | | | | T |
| 21 | 2 | NO STAPLING ON RIGHT SIDE OF THICK PAPER | | | | | T |
| 22 | 2 | NO STAPLING AT TOP OF THICK PAPER | | | | | T |
| 23 | 2 | NO STAPLING AT UPPER LEFT POSITION OF THICK PAPER | | | | | T |
| 24 | 2 | NO STAPLING AT LOWER LEFT POSITION OF THICK PAPER | | | | | T |
| 25 | 2 | NO STAPLING AT LOWER RIGHT POSITION OF THICK PAPER | | | | | T |
| 26 | 2 | NO STAPLING AT UPPER RIGHT POSITION OF THICK PAPER | | | | | T |
| 27 | 3 | NO STAPLING ON LEFT SIDE OF A3 PLAIN PAPER | | T | T | | |
| 28 | 3 | NO STAPLING ON RIGHT SIDE OF A3 PLAIN PAPER | | T | | | |
| 29 | 3 | NO STAPLING ON LEFT SIDE OF A3 PLAIN PAPER 2 | | | | | |
| 30 | 3 | NO STAPLING ON RIGHT SIDE OF A3 PLAIN PAPER 2 | | | | | |
| 31 | 3 | NO STAPLING ON LEFT SIDE OF A3 PLAIN PAPER 3 | | | | | |
| 32 | 3 | NO STAPLING ON RIGHT SIDE OF A3 PLAIN PAPER 3 | | | | | |
| 33 | 2 | NO PUNCHING ON LEFT SIDE OF A3 PAPER | | | | | |
| 34 | 2 | NO PUNCHING ON RIGHT SIDE OF A3 PAPER | | | | | |
| 35 | 2 | PLAIN PAPER IS NOT AVAILABLE FOR COVER SHEET | | T | | | |

FIG.13B2

| | I | J | K | L | M | N | O | P | Q | R | S | T | U | V | W | X | Y | Z | AA |
|---|---|---|---|---|---|---|---|---|---|---|---|---|---|---|---|---|---|---|---|
| | SHEET SIZE | | | STAPLING | | | | | | | | PUNCHING (TWO HOLES) | | | | | TWO-SIDED | COVER SHEET |
| | A5 | A4 | A3 | ANY | LEFT | BOTTOM | RIGHT | TOP | UPPER LEFT | LOWER LEFT | LOWER RIGHT | UPPER RIGHT | ANY | LEFT | BOTTOM | RIGHT | TOP | | |
| | T | | | | | | | | | | | | | | | | | T | |
| | | T | | | | | | | | | | | | | | | | T | |
| | | T | | | | | | | | | | | | | | | | | |
| | | | | T | | | | | | | | | T | | | | | | |
| | | | | T | | | | | | | | | | T | | | | | |
| | | | | | T | | | | | | | | | | T | | | | |
| | | | | | | T | | | | | | | | | | T | | | |
| | | | | | | | T | | | | | | | | | | T | | |
| | | | | | | | | T | | | | | | | | | | | |
| | | | | | | | | | T | | | | | | | | | | |
| | | | | | | | | | | T | | | | | | | | | |
| | | | | | | | | | | | T | T | | | | | | | |
| | | | | T | T | | | T | T | | | | | | | | | | |
| | | | T | T | T | T | T | T | | | | | | | | | | | |
| | | | | | | | T | | | | | | | T | T | | | | T |
| | | | | | | | | | | | | | | | | | | | T |

FIG. 13C1

| MANAGEMENT NUMBER | NUMBER OF PROHIBITION ITEMS (BY CONDITION) | RULE DESCRIPTION | SHEET TYPE | | | THICK PAPER |
|---|---|---|---|---|---|---|
| | | | ANY | PLAIN PAPER | | |
| 1 | 2 | A5 SHEET IS NOT AVAILABLE FOR TWO-SIDED PRINT | | | | |
| 2 | 2 | THICK PAPER IS NOT AVAILABLE FOR TWO-SIDED PRINT | | | | T |
| 4 | 2 | NO PUNCHING AT ARBITRARY POSITION OF A5 PAPER | | | | |
| 5 | 2 | NO PUNCHING ON LEFT SIDE OF A5 PAPER | | | | |
| 6 | 2 | NO PUNCHING AT BOTTOM OF A5 PAPER | | | | |
| 7 | 2 | NO PUNCHING ON RIGHT SIDE OF A5 PAPER | | | | |
| 8 | 2 | NO PUNCHING AT TOP OF A5 PAPER | | | | |
| 9 | 2 | NO STAPLING AT ARBITRARY POSITION OF A5 PAPER | | | | |
| 10 | 2 | NO STAPLING ON LEFT SIDE OF A5 PAPER | | | | |
| 11 | 2 | NO STAPLING AT BOTTOM OF A5 PAPER | | | | |
| 12 | 2 | NO STAPLING ON RIGHT SIDE OF A5 PAPER | | | | |
| 13 | 2 | NO STAPLING AT TOP OF A5 PAPER | | | | |
| 14 | 2 | NO STAPLING AT UPPER LEFT POSITION OF A5 PAPER | | | | |
| 15 | 2 | NO STAPLING AT LOWER LEFT POSITION OF A5 PAPER | | | | |
| 16 | 2 | NO STAPLING AT LOWER RIGHT POSITION OF A5 PAPER | | | | |
| 17 | 2 | NO STAPLING AT UPPER RIGHT POSITION OF A5 PAPER | | | | |
| 18 | 2 | NO STAPLING AT ARBITRARY POSITION OF THICK PAPER | | | | |
| 19 | 2 | NO STAPLING ON LEFT SIDE OF THICK PAPER | | | | |
| 20 | 2 | NO STAPLING AT BOTTOM OF THICK PAPER | | | | |
| 21 | 2 | NO STAPLING ON RIGHT SIDE OF THICK PAPER | | | | |
| 22 | 2 | NO STAPLING AT TOP OF THICK PAPER | | | | T |
| 23 | 2 | NO STAPLING AT UPPER LEFT POSITION OF THICK PAPER | | | | T |
| 24 | 2 | NO STAPLING AT LOWER LEFT POSITION OF THICK PAPER | | | | T |
| 25 | 2 | NO STAPLING AT LOWER RIGHT POSITION OF THICK PAPER | | | | T |
| 26 | 2 | NO STAPLING AT UPPER RIGHT POSITION OF THICK PAPER | | | | T |
| 27 | 3 | NO STAPLING ON LEFT SIDE OF A3 PLAIN PAPER | | T | | |
| 28 | 3 | NO STAPLING ON RIGHT SIDE OF A3 PLAIN PAPER | | T | | |
| 33 | 3 | NO PUNCHING ON LEFT SIDE OF A3 PLAIN PAPER | | T | | |
| 34 | 2 | NO PUNCHING ON RIGHT SIDE OF A3 PAPER | | | | |
| 35 | 2 | PLAIN PAPER IS NOT AVAILABLE FOR COVER SHEET | | T | | |

| IPP SHEET TYPE | ANY | PLAIN PAPER | | | THICK PAPER |
|---|---|---|---|---|---|
| MAIN BODY SHEET TYPE | ANY | PLAIN PAPER 1 | PLAIN PAPER 2 | PLAIN PAPER 3 | THICK PAPER |

FIG.15A

| FUNCTION LIST | SHEET TYPE ||||SHEET SIZE ||||STAPLING |||||||||PUNCHING (TWO HOLES) |||||TWO-SIDED | COVER SHEET |
| --- | --- | --- | --- | --- | --- | --- | --- | --- | --- | --- | --- | --- | --- | --- | --- | --- | --- | --- | --- | --- | --- | --- |
| | ANY | PLAIN PAPER 1 | PLAIN PAPER 2 | PLAIN PAPER 3 | THICK PAPER | A5 | A4 | A3 | ANY | LEFT | BOTTOM | RIGHT | TOP | UPPER LEFT | LOWER LEFT | LOWER RIGHT | UPPER RIGHT | ANY | LEFT | BOTTOM | RIGHT | TOP | | |
| IPP PRINT SERVICE 3 | ○ | — | — | — | ○ | ○ | ○ | ○ | ○ | ○ | ○ | ○ | ○ | ○ | ○ | ○ | ○ | × | × | × | × | × | ○ | ○ |

FIG.15B1

| A | B | C | D | E | F | G | H |
|---|---|---|---|---|---|---|---|
| | | | | SHEET TYPE | | | |
| MANAGEMENT NUMBER | NUMBER OF PROHIBITION ITEMS (BY CONDITION) | RULE DESCRIPTION | ANY | PLAIN PAPER 1 | PLAIN PAPER 2 | PLAIN PAPER 3 | THICK PAPER |
| 1 | 2 | A5 SHEET IS NOT AVAILABLE FOR TWO-SIDED PRINT | | | | | |
| 2 | 2 | THICK PAPER IS NOT AVAILABLE FOR TWO-SIDED PRINT | | | | | T |
| 3 | 2 | PLAIN PAPER 3 IS NOT AVAILABLE FOR TWO-SIDED PRINT | | | | T | |
| 4 | 2 | NO PUNCHING AT ARBITRARY POSITION OF A5 PAPER | | | | | |
| 5 | 2 | NO PUNCHING ON LEFT SIDE OF A5 PAPER | | | | | |
| 6 | 2 | NO PUNCHING AT BOTTOM OF A5 PAPER | | | | | |
| 7 | 2 | NO PUNCHING ON RIGHT SIDE OF A5 PAPER | | | | | |
| 8 | 2 | NO PUNCHING AT TOP OF A5 PAPER | | | | | |
| 9 | 2 | NO STAPLING AT ARBITRARY POSITION OF A5 PAPER | | | | | |
| 10 | 2 | NO STAPLING ON LEFT SIDE OF A5 PAPER | | | | | |
| 11 | 2 | NO STAPLING AT BOTTOM OF A5 PAPER | | | | | |
| 12 | 2 | NO STAPLING ON RIGHT SIDE OF A5 PAPER | | | | | |
| 13 | 2 | NO STAPLING AT TOP OF A5 PAPER | | | | | |
| 14 | 2 | NO STAPLING AT UPPER LEFT POSITION OF A5 PAPER | | | | | |
| 15 | 2 | NO STAPLING AT LOWER LEFT POSITION OF A5 PAPER | | | | | |
| 16 | 2 | NO STAPLING AT LOWER RIGHT POSITION OF A5 PAPER | | | | | |
| 17 | 2 | NO STAPLING AT UPPER RIGHT POSITION OF A5 PAPER | | | | | |
| 18 | 2 | NO STAPLING AT ARBITRARY POSITION OF THICK PAPER | | | | | |
| 19 | 2 | NO STAPLING ON LEFT SIDE OF THICK PAPER | | | | | |
| 20 | 2 | NO STAPLING AT BOTTOM OF THICK PAPER | | | | | |
| 21 | 2 | NO STAPLING ON RIGHT SIDE OF THICK PAPER | | | | | |
| 22 | 2 | NO STAPLING AT TOP OF THICK PAPER | | | | | |
| 23 | 2 | NO STAPLING AT UPPER LEFT POSITION OF THICK PAPER | | | | | |
| 24 | 2 | NO STAPLING AT LOWER LEFT POSITION OF THICK PAPER | | | | | |
| 25 | 2 | NO STAPLING AT LOWER RIGHT POSITION OF THICK PAPER | | | | | |
| 26 | 2 | NO STAPLING AT UPPER RIGHT POSITION OF THICK PAPER | | | T | | |
| 27 | 3 | NO STAPLING ON LEFT SIDE OF A3 PLAIN PAPER 1 | | T | | | |
| 28 | 3 | NO STAPLING ON RIGHT SIDE OF A3 PLAIN PAPER 1 | | | | | |
| 29 | 3 | NO STAPLING ON LEFT SIDE OF A3 PLAIN PAPER 2 | | | | | |
| 30 | 3 | NO STAPLING ON RIGHT SIDE OF A3 PLAIN PAPER 2 | | | | | |
| 31 | 3 | NO STAPLING ON LEFT SIDE OF A3 PLAIN PAPER 3 | | | | | |
| 32 | 3 | NO STAPLING ON RIGHT SIDE OF A3 PLAIN PAPER 3 | | | | T | |
| 33 | 2 | NO PUNCHING ON LEFT SIDE OF A3 PAPER | | | | | |
| 34 | 2 | NO PUNCHING ON RIGHT SIDE OF A3 PAPER | | | | | |
| 35 | 2 | PLAIN PAPER 1 IS NOT AVAILABLE FOR COVER SHEET | | T | | | |

| A | B | C | D | E | F | G | H |
|---|---|---|---|---|---|---|---|
| | | | | SHEET TYPE | | | |
| MANAGEMENT NUMBER | NUMBER OF PROHIBITION ITEMS (BY CONDITION) | RULE DESCRIPTION | ANY | PLAIN PAPER | | | THICK PAPER |
| 1 | 2 | A5 SHEET IS NOT AVAILABLE FOR TWO-SIDED PRINT | | | | | |
| 2 | 2 | THICK PAPER IS NOT AVAILABLE FOR TWO-SIDED PRINT | | | | | T |
| 3 | 2 | PLAIN PAPER 3 IS NOT AVAILABLE FOR TWO-SIDED PRINT | | | | | |
| 9 | 2 | NO STAPLING AT ARBITRARY POSITION OF A5 PAPER | | | | | |
| 10 | 2 | NO STAPLING ON LEFT SIDE OF A5 PAPER | | | | | |
| 11 | 2 | NO STAPLING AT BOTTOM OF A5 PAPER | | | | | |
| 12 | 2 | NO STAPLING ON RIGHT SIDE OF A5 PAPER | | | | | |
| 13 | 2 | NO STAPLING AT TOP OF A5 PAPER | | | | | |
| 14 | 2 | NO STAPLING AT UPPER LEFT POSITION OF A5 PAPER | | | | | |
| 15 | 2 | NO STAPLING AT LOWER LEFT POSITION OF A5 PAPER | | | | | |
| 16 | 2 | NO STAPLING AT UPPER RIGHT POSITION OF A5 PAPER | | | | | |
| 17 | 2 | NO STAPLING AT LOWER RIGHT POSITION OF A5 PAPER | | | | | |
| 18 | 2 | NO STAPLING AT ARBITRARY POSITION OF THICK PAPER | | | | | T |
| 19 | 2 | NO STAPLING ON LEFT SIDE OF THICK PAPER | | | | | T |
| 20 | 2 | NO STAPLING AT BOTTOM OF THICK PAPER | | | | | T |
| 21 | 2 | NO STAPLING ON RIGHT SIDE OF THICK PAPER | | | | | T |
| 22 | 2 | NO STAPLING AT TOP OF THICK PAPER | | | | | T |
| 23 | 2 | NO STAPLING AT UPPER LEFT POSITION OF THICK PAPER | | | | | T |
| 24 | 2 | NO STAPLING AT LOWER LEFT POSITION OF THICK PAPER | | | | | T |
| 25 | 2 | NO STAPLING AT UPPER RIGHT POSITION OF THICK PAPER | | | | | T |
| 26 | 2 | NO STAPLING AT LOWER RIGHT POSITION OF THICK PAPER | | | | | T |
| 27 | 3 | NO STAPLING ON LEFT SIDE OF A3 PLAIN PAPER | | T | | | |
| 28 | 3 | NO STAPLING ON RIGHT SIDE OF A3 PLAIN PAPER | | T | | | |
| 29 | 3 | NO STAPLING ON LEFT SIDE OF A3 PLAIN PAPER | | T | | | |
| 30 | 3 | NO STAPLING ON RIGHT SIDE OF A3 PLAIN PAPER | | T | | | |
| 31 | 3 | NO STAPLING ON LEFT SIDE OF A3 PLAIN PAPER | | T | | | |
| 32 | 3 | NO STAPLING ON RIGHT SIDE OF A3 PLAIN PAPER | | T | | | |
| 35 | 2 | PLAIN PAPER 1 IS NOT AVAILABLE FOR COVER SHEET | | | | | |

FIG.15C2

| I | J | K | L | M | N | O | P | Q | R | S | T | U | V | W | X | Y | Z | AA |
|---|---|---|---|---|---|---|---|---|---|---|---|---|---|---|---|---|---|---|
| SHEET SIZE | | | STAPLING | | | | | | | | | PUNCHING (TWO HOLES) | | | | | TWO-SIDED | COVER SHEET |
| A5 | A4 | A3 | ANY | LEFT | BOTTOM | RIGHT | TOP | UPPER LEFT | LOWER LEFT | LOWER RIGHT | UPPER RIGHT | ANY | LEFT | BOTTOM | RIGHT | TOP | | |

FIG. 15D1

| A | B | C | D | E | F |
|---|---|---|---|---|---|
| | | | | SHEET TYPE | |
| MANAGEMENT NUMBER | NUMBER OF PROHIBITION ITEMS (BY CONDITION) | RULE DESCRIPTION | ANY | PLAIN PAPER | THICK PAPER |
| 1 | 2 | A5 SHEET IS NOT AVAILABLE FOR TWO-SIDED PRINT | | | |
| 2 | 2 | THICK PAPER IS NOT AVAILABLE FOR TWO-SIDED PRINT | | | T |
| 3 | 2 | PLAIN PAPER 3 IS NOT AVAILABLE FOR TWO-SIDED PRINT | | T | |
| 9 | 2 | NO STAPLING AT ARBITRARY POSITION OF A5 PAPER | | | |
| 10 | 2 | NO STAPLING ON LEFT SIDE OF A5 PAPER | | | |
| 11 | 2 | NO STAPLING AT BOTTOM OF A5 PAPER | | | |
| 12 | 2 | NO STAPLING ON RIGHT SIDE OF A5 PAPER | | | |
| 13 | 2 | NO STAPLING AT TOP OF A5 PAPER | | | |
| 14 | 2 | NO STAPLING AT UPPER LEFT POSITION OF A5 PAPER | | | |
| 15 | 2 | NO STAPLING AT LOWER LEFT POSITION OF A5 PAPER | | | |
| 16 | 2 | NO STAPLING AT LOWER RIGHT POSITION OF A5 PAPER | | | |
| 17 | 2 | NO STAPLING AT UPPER RIGHT POSITION OF A5 PAPER | | | |
| 18 | 2 | NO STAPLING AT ARBITRARY POSITION OF THICK PAPER | | | T |
| 19 | 2 | NO STAPLING ON LEFT SIDE OF THICK PAPER | | | T |
| 20 | 2 | NO STAPLING AT BOTTOM OF THICK PAPER | | | T |
| 21 | 2 | NO STAPLING ON RIGHT SIDE OF THICK PAPER | | | T |
| 22 | 2 | NO STAPLING AT TOP OF THICK PAPER | | | T |
| 23 | 2 | NO STAPLING AT UPPER LEFT POSITION OF THICK PAPER | | | T |
| 24 | 2 | NO STAPLING AT LOWER LEFT POSITION OF THICK PAPER | | | T |
| 25 | 2 | NO STAPLING AT LOWER RIGHT POSITION OF THICK PAPER | | | T |
| 26 | 2 | NO STAPLING AT UPPER RIGHT POSITION OF THICK PAPER | | | T |
| 27 | 3 | NO STAPLING ON LEFT SIDE OF A3 PLAIN PAPER | | T | |
| 28 | 3 | NO STAPLING ON RIGHT SIDE OF A3 PLAIN PAPER | | T | |
| 35 | 2 | PLAIN PAPER IS NOT AVAILABLE FOR COVER SHEET | | | |

FIG. 15D2

| | I | J | K | L | M | N | O | P | Q | R | S | T | U | V | W | X | Y | Z | AA |
|---|---|---|---|---|---|---|---|---|---|---|---|---|---|---|---|---|---|---|---|
| | SHEET SIZE | | | STAPLING | | | | | | | | | PUNCHING (TWO HOLES) | | | | | TWO-SIDED | COVER SHEET |
| | A5 | A4 | A3 | ANY | LEFT | BOTTOM | RIGHT | TOP | UPPER LEFT | LOWER LEFT | LOWER RIGHT | UPPER RIGHT | ANY | LEFT | BOTTOM | RIGHT | TOP | | |

FIG. 16A

| FUNCTION LIST | SHEET TYPE | | | | | SHEET SIZE | | | STAPLING | | | | | | | | | PUNCHING (TWO HOLES) | | | | | TWO-SIDED | COVER SHEET |
|---|---|---|---|---|---|---|---|---|---|---|---|---|---|---|---|---|---|---|---|---|---|---|---|
| | ANY | PLAIN PAPER 1 | PLAIN PAPER 2 | PLAIN PAPER 3 | THICK PAPER | A5 | A4 | A3 | ANY | LEFT | BOTTOM | RIGHT | TOP | UPPER LEFT | LOWER LEFT | LOWER RIGHT | UPPER RIGHT | ANY | LEFT | BOTTOM | RIGHT | TOP | | |
| IPP PRINT SERVICE 4 | O | - | - | - | O | O | O | O | X | X | X | X | X | X | X | X | X | O | O | O | O | O | O | O |

FIG.16B1

| A | B | C | D | E | F | G | H |
|---|---|---|---|---|---|---|---|
| | | | | | SHEET TYPE | | |
| MANAGEMENT NUMBER | NUMBER OF PROHIBITION ITEMS (BY CONDITION) | RULE DESCRIPTION | ANY | PLAIN PAPER 1 | PLAIN PAPER 2 | PLAIN PAPER 3 | THICK PAPER |
| 1 | 2 | A5 SHEET IS NOT AVAILABLE FOR TWO-SIDED PRINT | | | | | |
| 2 | 2 | THICK PAPER IS NOT AVAILABLE FOR TWO-SIDED PRINT | | | | | T |
| 3 | 2 | PLAIN PAPER 3 IS NOT AVAILABLE FOR TWO-SIDED PRINT | | | | T | |
| 4 | 2 | NO PUNCHING AT ARBITRARY POSITION OF A5 PAPER | | | | | |
| 5 | 2 | NO PUNCHING ON LEFT SIDE OF A5 PAPER | | | | | |
| 6 | 2 | NO PUNCHING ON RIGHT SIDE OF A5 PAPER | | | | | |
| 7 | 2 | NO PUNCHING AT BOTTOM OF A5 PAPER | | | | | |
| 8 | 2 | NO PUNCHING AT TOP OF A5 PAPER | | | | | |
| 9 | 2 | NO STAPLING AT ARBITRARY POSITION OF A5 PAPER | | | | | |
| 10 | 2 | NO STAPLING ON LEFT SIDE OF A5 PAPER | | | | | |
| 11 | 2 | NO STAPLING AT BOTTOM OF A5 PAPER | | | | | |
| 12 | 2 | NO STAPLING ON RIGHT SIDE OF A5 PAPER | | | | | |
| 13 | 2 | NO STAPLING ON TOP OF A5 PAPER | | | | | |
| 14 | 2 | NO STAPLING AT UPPER LEFT POSITION OF A5 PAPER | | | | | |
| 15 | 2 | NO STAPLING AT LOWER LEFT POSITION OF A5 PAPER | | | | | |
| 16 | 2 | NO STAPLING AT UPPER RIGHT POSITION OF A5 PAPER | | | | | |
| 17 | 2 | NO STAPLING AT LOWER RIGHT POSITION OF A5 PAPER | | | | | |
| 18 | 2 | NO STAPLING AT ARBITRARY POSITION OF THICK PAPER | | | | | T |
| 19 | 2 | NO STAPLING AT BOTTOM OF THICK PAPER | | | | | T |
| 20 | 2 | NO STAPLING ON LEFT SIDE OF THICK PAPER | | | | | T |
| 21 | 2 | NO STAPLING ON RIGHT SIDE OF THICK PAPER | | | | | T |
| 22 | 2 | NO STAPLING AT TOP OF THICK PAPER | | | | | T |
| 23 | 2 | NO STAPLING AT UPPER LEFT POSITION OF THICK PAPER | | | | | T |
| 24 | 2 | NO STAPLING AT LOWER LEFT POSITION OF THICK PAPER | | | | | T |
| 25 | 2 | NO STAPLING AT UPPER RIGHT POSITION OF THICK PAPER | | | | | |
| 26 | 2 | NO STAPLING AT LOWER RIGHT POSITION OF THICK PAPER | | | | | |
| 27 | 3 | NO STAPLING ON LEFT SIDE OF A3 PLAIN PAPER 1 | | T | | | |
| 28 | 3 | NO STAPLING ON RIGHT SIDE OF A3 PLAIN PAPER 1 | | T | | | |
| 29 | 3 | NO STAPLING ON LEFT SIDE OF A3 PLAIN PAPER 2 | | | T | | |
| 30 | 3 | NO STAPLING ON RIGHT SIDE OF A3 PLAIN PAPER 2 | | | T | | |
| 31 | 3 | NO STAPLING ON LEFT SIDE OF A3 PLAIN PAPER 3 | | | | T | |
| 32 | 3 | NO STAPLING ON RIGHT SIDE OF A3 PLAIN PAPER 3 | | | | T | |
| 33 | 2 | NO PUNCHING ON LEFT SIDE OF A3 PAPER | | | | | |
| 34 | 2 | NO PUNCHING ON RIGHT SIDE OF A3 PAPER | | | | | |
| 35 | 2 | PLAIN PAPER 1 IS NOT AVAILABLE FOR COVER SHEET | | T | | | |

FIG.16B2

| | I | J | K | L | M | N | O | P | Q | R | S | T | U | V | W | X | Y | Z | AA |
|---|---|---|---|---|---|---|---|---|---|---|---|---|---|---|---|---|---|---|---|
| | SHEET SIZE | | | STAPLING | | | | | | | | | PUNCHING (TWO HOLES) | | | | | TWO-SIDED | COVER SHEET |
| | A5 | A4 | A3 | ANY | LEFT | BOTTOM | RIGHT | TOP | UPPER LEFT | LOWER LEFT | LOWER RIGHT | UPPER RIGHT | ANY | LEFT | BOTTOM | RIGHT | TOP | | |

FIG. 16C1

| A | B | C | D | E | F | G | H |
|---|---|---|---|---|---|---|---|
| | | | | SHEET TYPE | | | |
| MANAGEMENT NUMBER | NUMBER OF PROHIBITION ITEMS (BY CONDITION) | RULE DESCRIPTION | ANY | PLAIN PAPER | | | THICK PAPER |
| 1 | 2 | A5 SHEET IS NOT AVAILABLE FOR TWO-SIDED PRINT | | | | | |
| 2 | 2 | THICK PAPER IS NOT AVAILABLE FOR TWO-SIDED PRINT | | | | | T |
| 3 | 2 | PLAIN PAPER 3 IS NOT AVAILABLE FOR TWO-SIDED PRINT | | | | | |
| 4 | 2 | NO PUNCHING AT ARBITRARY POSITION OF A5 PAPER | | | | | |
| 5 | 2 | NO PUNCHING ON LEFT SIDE OF A5 PAPER | | | | | |
| 6 | 2 | NO PUNCHING AT BOTTOM OF A5 PAPER | | | | | |
| 7 | 2 | NO PUNCHING ON RIGHT SIDE OF A5 PAPER | | | | | |
| 8 | 2 | NO PUNCHING AT TOP OF A5 PAPER | | | | | |
| 33 | 2 | NO PUNCHING ON LEFT SIDE OF A3 PAPER | | | | | |
| 34 | 2 | NO PUNCHING ON RIGHT SIDE OF A3 PAPER | | | | | |
| 35 | 2 | PLAIN PAPER IS NOT AVAILABLE FOR COVER SHEET | | | | | |

| SERVICE | DETAIL OF SORTING MEASURE OF IPP PRINT SERVICES | SUPPORT OF SEARCH |
|---|---|---|
| IPP PRINT SERVICE (1) | http://<ip.addr>/ipp/print<br>Port:631 | × |
| IPP PRINT SERVICE (2) | http://<ip.addr>/ipp/print<br>Port:10631<br>UserAgent: Client_for_IPPPrintService2 | ○ |
| IPP PRINT SERVICE (3) | http://<ip.addr>/ipp/print<br>Port:10631<br>UserAgent: Client_for_IPPPrintService3 | ○ |
| IPP PRINT SERVICE (4) | http://<ip.addr>/ipp/print<br>Port:10631<br>UserAgent: Client_for_IPPPrintService4 | ○ |

IMAGE FORMING APPARATUS, CONTROL METHOD OF THE IMAGE FORMING APPARATUS, AND COMPUTER-READABLE STORAGE MEDIUM

CROSS-REFERENCE TO RELATED APPLICATIONS

The present application is a continuation of U.S. patent application Ser. No. 16/371,628, filed on Apr. 1, 2019, which claims priority from Japanese Patent Application No. 2018-077924, filed Apr. 13, 2018, all of which are hereby incorporated by reference herein in their entireties.

BACKGROUND OF THE INVENTION

Field of the Invention

The present disclosure relates to an image forming apparatus that can execute image forming and other processing based on a setting.

Description of the Related Art

There is a printing apparatus that receives print data from an information processing apparatus and performs printing. It is known that an information processing apparatus generates print data using a printer driver (or printing application) designed for individual printing apparatus. However, recently, there have been an increasing number of cases where the information processing apparatus generates print data without using the printer driver (or printing application) designed for individual printing apparatus. For example, the latest printing application and print services on the clouds generate print data of Internet Printing Protocol (IPP) standards and transmit the print data to the printing apparatus.

SUMMARY OF THE INVENTION

While a printing apparatus is in an environment in which a print job is received from various devices, each print job may include a print setting and print data that can be processed by the printing apparatus.

According to an aspect of the present disclosure, an image forming apparatus to communicate with an information processing apparatus includes a reception unit configured to receive information for identifying a print service included in the information processing apparatus, and a transmission unit configured to transmit, to the information processing apparatus, a prohibition condition, wherein the prohibition condition represents a condition relating to a print setting that cannot be set depending on capabilities of a printing apparatus and of the print setting, and wherein the prohibition condition is for a print service corresponding to the information received by the reception unit.

Further features of the present disclosure will become apparent from the following description of embodiments with reference to the attached drawings.

BRIEF DESCRIPTION OF THE DRAWINGS

FIG. 5 is a diagram illustrating an example of a prohibition information acquisition request and a response thereto.

FIGS. 9A and 9B are tables illustrating an example of a prohibition condition list of the printing apparatus.

FIG. 10 is a table illustrating an example of support functions by a printer and Internet Printing Protocol (IPP) print services.

FIGS. 11A to 11C2 are tables illustrating an example of prohibition condition lists of an IPP print service 1.

FIG. 12 is a table illustrating an example of correspondences between sheet types of an IPP print service 2 and sheet types of a printing apparatus main body.

FIGS. 13A to 13C2 are tables illustrating an example of prohibition condition lists of the IPP print service 2.

FIG. 14 is a table illustrating an example of correspondences between sheet types of IPP print services 3 and 4 and the sheet types of the printing apparatus main body.

FIGS. 15A to 15D2 are tables illustrating an example of prohibition condition lists of the IPP print service 3.

Figure 16C2:
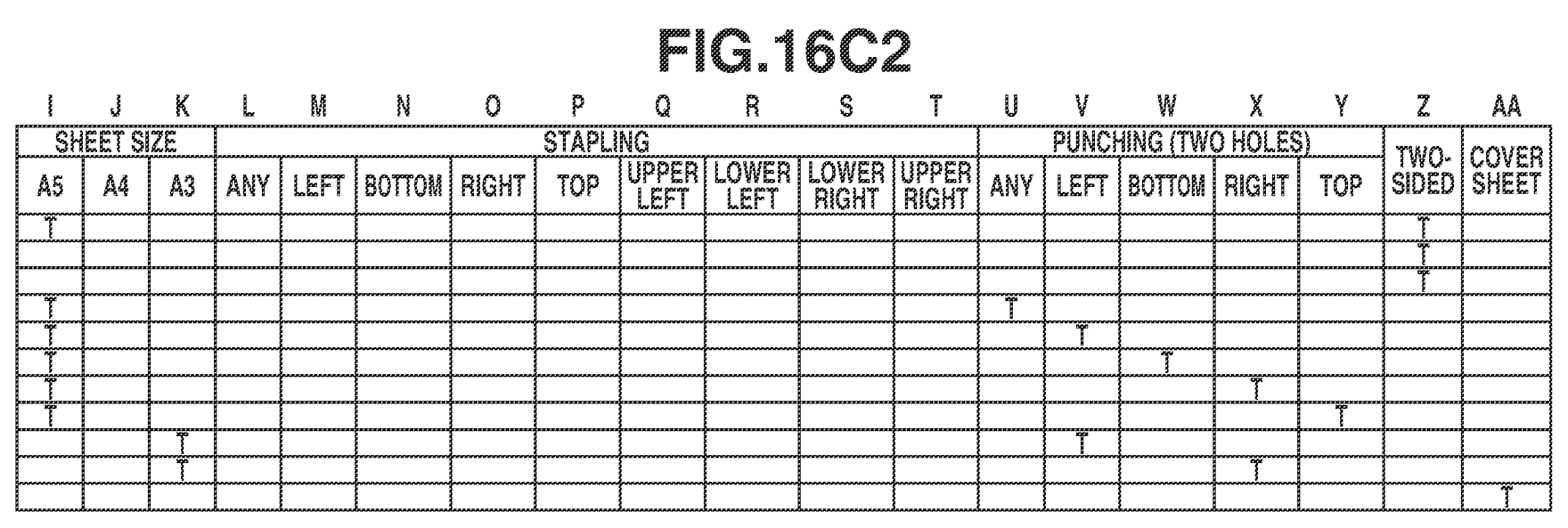

FIGS. 16A to 16C2 are tables illustrating an example of prohibition condition lists of the IPP print service 4.

FIG. 17 is a table illustrating the IPP print services 1 to 4.

DESCRIPTION OF THE EMBODIMENTS

Embodiments of the present disclosure will be described in detail below with reference to the attached drawings.

Figure 1:
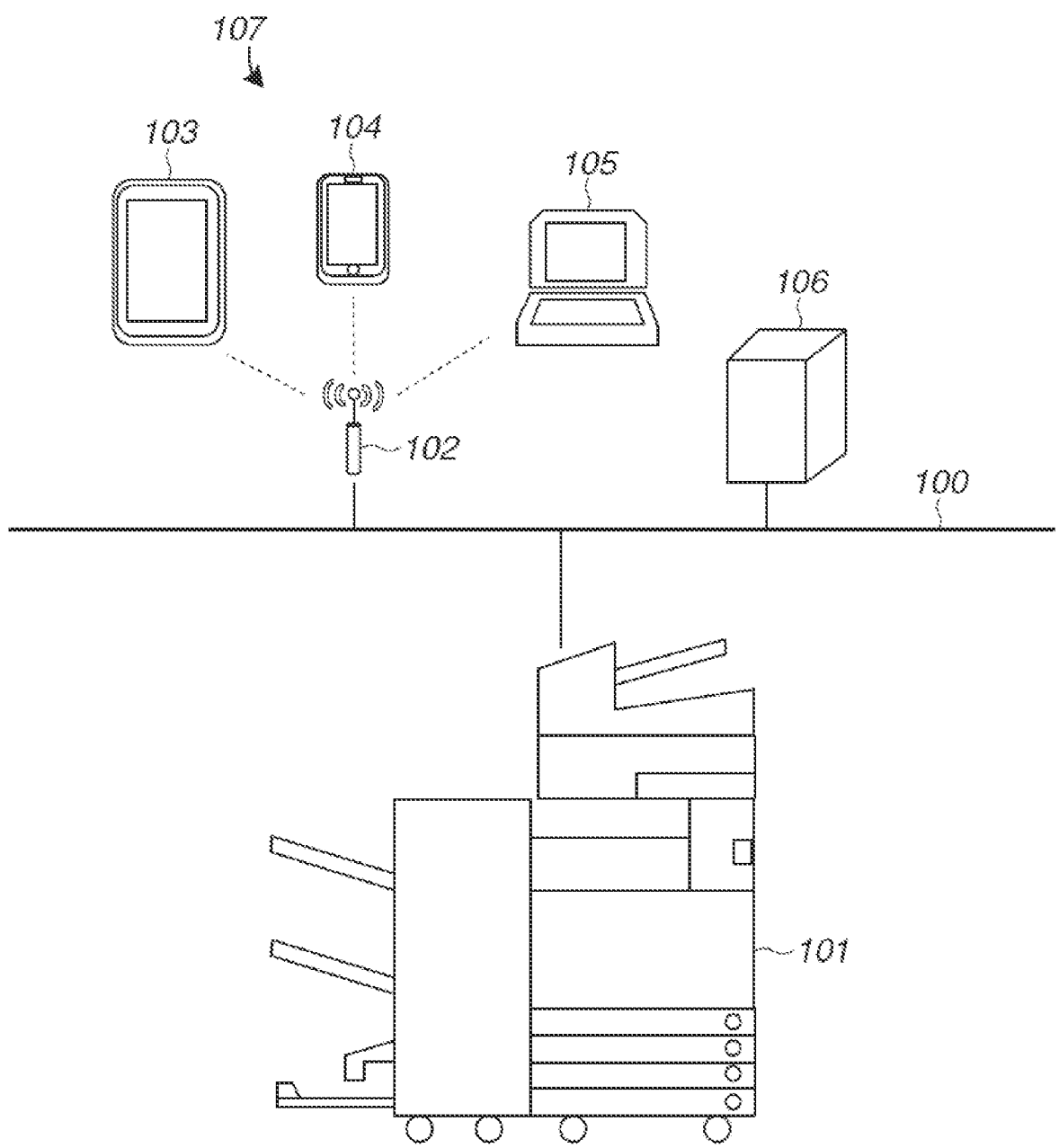
FIG. 1 is a diagram illustrating an example of a configuration of a printing system according to an embodiment of the present disclosure.

FIG. 1 is a diagram illustrating a configuration of a printing system according to an embodiment of the present disclosure. To a local area network (LAN) 100, a printing apparatus 101 and an access point (AP) 102 are connected in a mutually communicable manner. In the present embodiment, mobile terminals 103, 104, and 105 such as a tablet, a smartphone, and a personal computer (PC) are described as an example of an information processing apparatus 107. In descriptions below, the tablet 103, the smartphone 104, and the PC 105 are generally referred to as the information processing apparatus 107. The information processing apparatus 107 can mutually communicate with the printing apparatus 101 on the LAN 100 via the AP 102. A print setting management server 106 manages information about a printing function that can be set by a user of each of the information processing apparatuses 103, 104, and 105 in a case where the printing apparatus 101 processes a print job. The printing apparatus 101 performs print processing upon receiving a print job request from the information processing apparatus 107.

The printing apparatus 101 has a function of printing an image on a sheet (recording medium). The printing apparatus 101 can execute print processing based on print data received via the network.

In the present embodiment, the above-described configuration is described as an example of the printing system. However, the present embodiment is not limited to the above-described configuration and can be applied to a configuration in which at least one or more information processing apparatuses and printing apparatuses are communicably connected with each other via a network. In addition, a wireless or wired network can be used.

Figure 2:
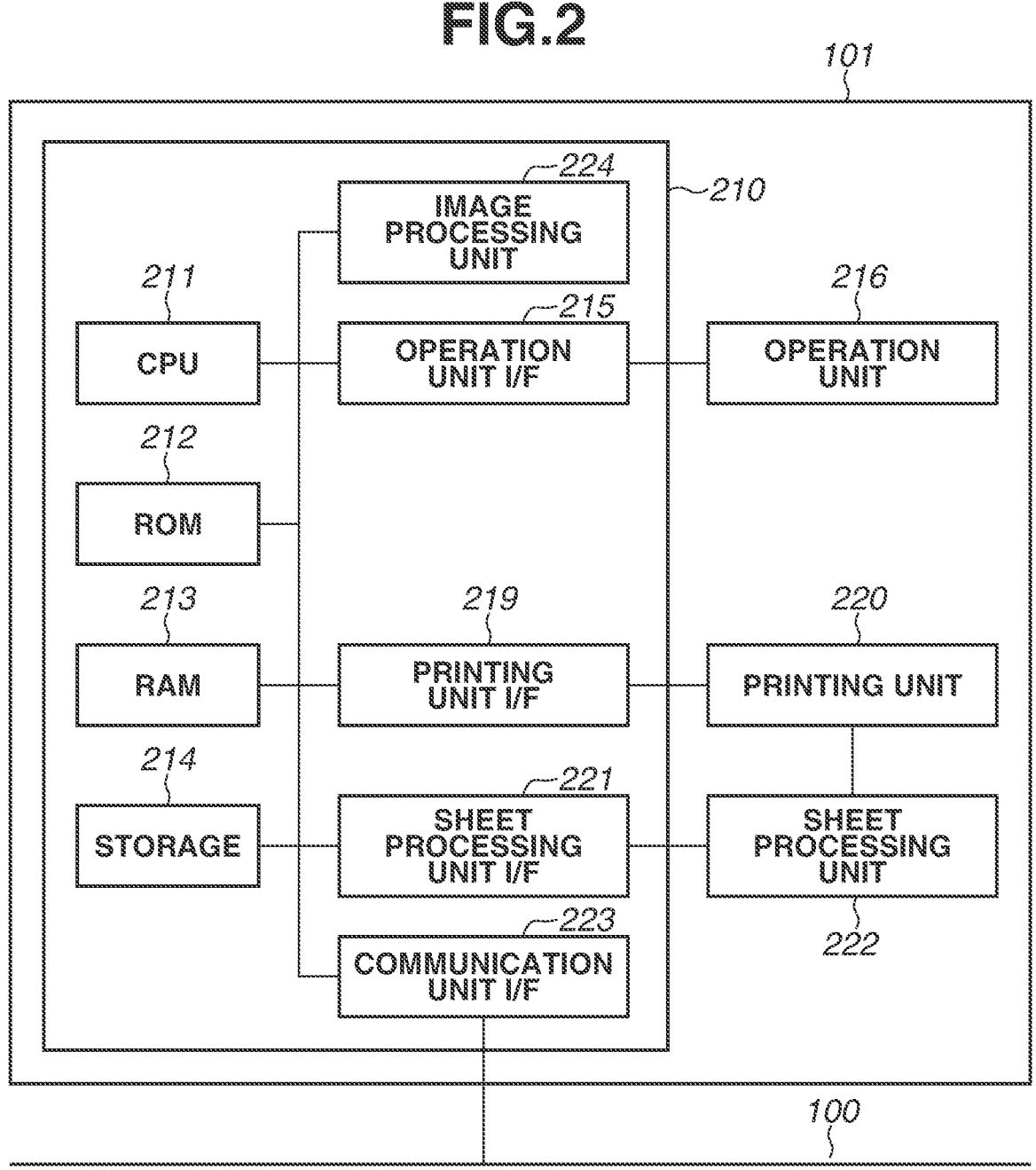
FIG. 2 is a block diagram illustrating an example of a hardware configuration of a printing apparatus.

FIG. 2 is a block diagram illustrating a hardware configuration of the printing apparatus 101 according to the present embodiment. The printing apparatus 101 has the function of printing an image on a sheet. In the present embodiment, the printing apparatus is described as an example. The printing apparatus includes a multifunction peripheral (MFP), which is a printing apparatus having scanner and facsimile functions.

A control unit 210 including a central processing unit (CPU) 211 controls entire operation of the printing apparatus 101. The CPU 211 loads a program stored in a read-only memory (ROM) 212 or a storage 214 into a random access memory (RAM) 213 and executes the program to perform various types of control such as print control. The printing apparatus 101 can be a multi-functional peripheral (MFP). The ROM 212 stores a control program, a boot program, and the like that can be executed by the CPU 211. The RAM 213 is a main storage memory of the CPU 211 and is used as a working area or a temporary storage area for loading various control programs. The storage 214 stores print data, image data, various programs, and various setting information. In the present embodiment, an auxiliary storage device such as a hard disk drive (HDD) is used as the storage 214. However, a nonvolatile memory such as a solid state drive (SSD) may be used as the storage 214.

In the printing apparatus 101 according to the present embodiment, various types of processing illustrated in flowcharts described below are executed by the single CPU 211 using the single memory (the RAM 213). However, another configuration may also be used. For example, a plurality of CPUs, RAMs, ROMs, and storages may be configured to cooperate with each other. Further, part of processing may be executed using a hardware circuit such as an application specific integrated circuit (ASIC) and a field-programmable gate array (FPGA).

An operation unit 216 is connected to the control unit 210 with an operation unit interface (I/F) 215. The operation unit 216 includes a display unit having a touch panel function and various hard keys and functions as a display unit for displaying information and a reception unit for receiving a user instruction. A printing unit (printer engine) 220 is connected to the control unit 210 with a printing unit I/F 219. Image data generated by analyzing a print job received from the information processing apparatus is transferred from the control unit 210 to the printing unit 220 via the printing unit I/F 219. The printing unit 220 receives a control command and a print job to be printed via the control unit 210, and prints an image on a sheet fed from a sheet feeding cassette (not illustrated) based on the print job. A printing method of the printing unit 220 may be an electrophotographic method or an ink-jet method. In addition, another printing method such as a thermal transfer method can also be applied. The control unit 210 is connected to the LAN 100 via a communication unit I/F 223. The communication unit I/F 223 transmits image data and information to the information processing apparatus on the LAN 100 and receives a print job and information from the information processing apparatus on the LAN 100.

An image processing unit 224 has a function of a raster image processor (RIP) that generates image data to be used in printing by developing a print job received via the LAN 100. Further, the image processing unit 224 can perform resolution conversion and correction processing on the image data obtained by developing the print job. In the present embodiment, the image processing unit 224 is implemented by a hardware circuit (ASIC, FPGA, etc.). However, it is not limited to this configuration. For example, the printing apparatus 101 can further include a processor for image processing, and the processor can execute an image processing program to achieve image processing and developing processing into print data. In this case, the processor and the CPU 211 achieve the processing in cooperation with each other. Further, the CPU 211 can be configured to execute a program for performing image processing to perform the image processing and the developing processing of the print data. Furthermore, the image processing may also be performed by a combination of any of the above-described configurations. A sheet processing unit 222 is connected to the control unit 210 with a sheet processing unit I/F 221. The sheet processing unit 222 receives a control command from the control unit 210 and performs post processing on a sheet on which printing is performed by the printing unit 220 based on the control command.

A printer driver corresponding to the printing apparatus provides a plurality of setting items such as selection of a sheet type, an image quality setting, and selection of finishing processing. However, there is a case where a plurality of functions cannot be used at the same time depending on a setting. Such case is referred to as prohibition information. Based on the prohibition information, it is determined that a combination of setting items that cannot be specified at the same time has been specified by a user. Then, feedback is provided to the user. The prohibition information may also be referred to as conflict information.

There is a case where a printer driver provided by a vendor includes, in a program, the prohibition information optimized for an individual printer in advance. Accordingly, a combination of setting items that cannot be used is restricted on a print setting screen.

On the other hand, in Internet Printing Protocol (IPP) printing that is employed by a printing device from a mobile device, a print client does not include an individual printer driver in some cases. Accordingly, individual printing apparatus does not include a print screen and the prohibition information in many cases. Thus, in the IPP print, there is an issue that the print client inputs a print job to the printing apparatus without checking the prohibition information, whereby the printing apparatus needs to perform prohibition processing for the IPP print service. Further, there is an issue that the printing apparatus needs to deal with the prohibition information that is different for each IPP print service. The present embodiment is configured in view of the above-described issues.

Figure 3:
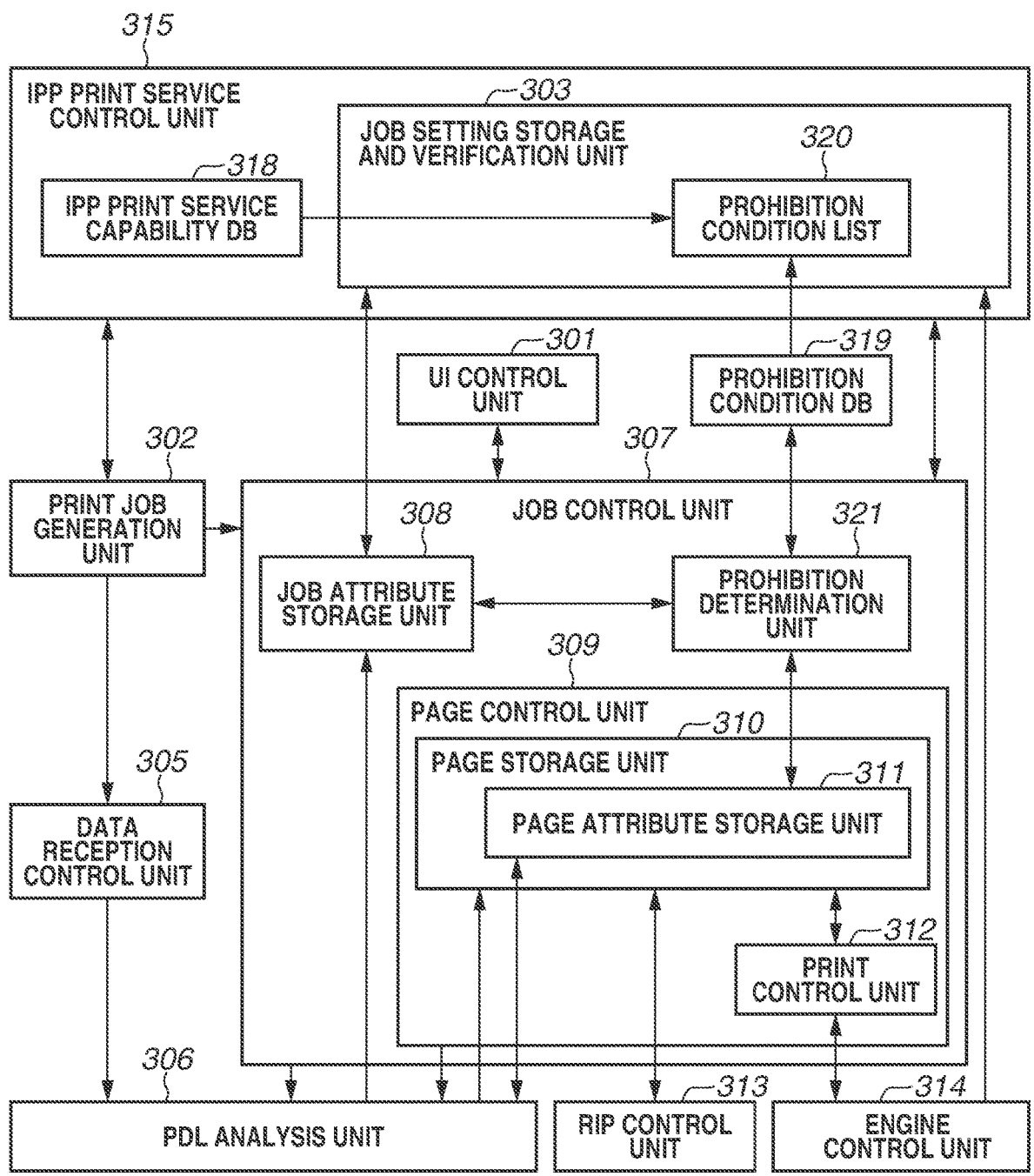
FIG. 3 is a functional block diagram illustrating an example of a software configuration of the printing apparatus.

FIG. 3 is a functional block diagram illustrating a software configuration of the printing apparatus 101 according to the present embodiment. In the present embodiment, each functional block illustrated in FIG. 3 is achieved by the CPU 211 executing a program loaded into the RAM 213.

A prohibition condition database (DB) 319 includes prohibition information generated based on a capability of the printing apparatus. The prohibition condition DB 319 is a table storing all of the prohibition information included in the printing apparatus and includes information about a connectable accessory and settable sheet. The prohibition condition DB 319 can include all the information about the accessory and the sheet that are expected or anticipated in advance from a specification of the printing apparatus according to the present embodiment. The prohibition condition is also referred to as a constraint.

Figure 9B:
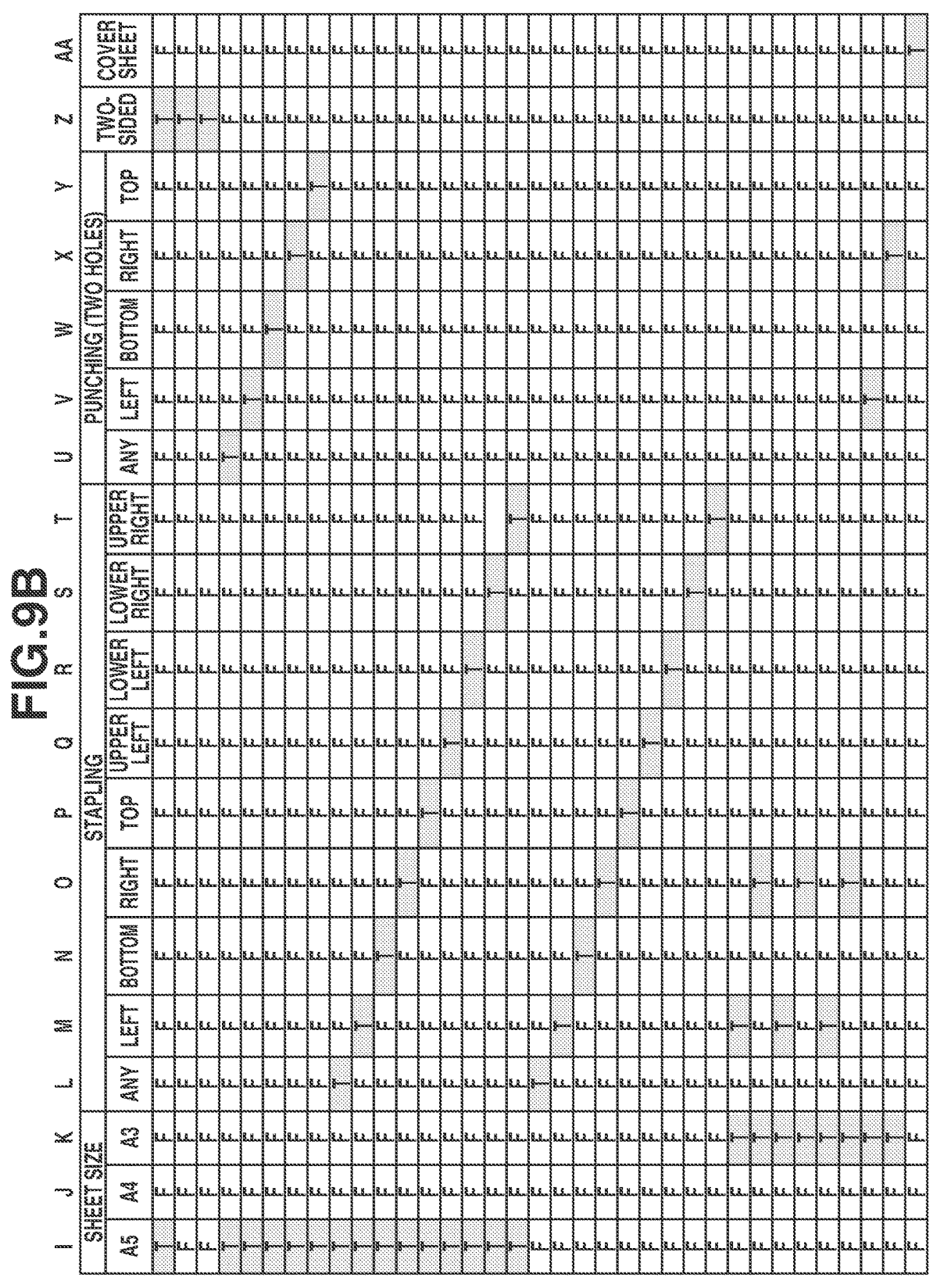

FIGS. 9A and 9B illustrate an internal structure of the prohibition condition DB 319. In the table (DB table), one row represents one prohibition condition. More specifically, the printing apparatus 101 includes 35 prohibition conditions, and each of the prohibition conditions is uniquely identified by a management number in a column A. A column B indicates the number of items that relate to the prohibition condition. The number of items corresponds to the number of Trues (Ts) for a rule of a certain row. A column C indicates an error content in a case where a print job is cancelled according to the prohibition condition, and the content is a message to be notified as IPP prohibition information. In columns D to AA, printing functions of the printing apparatus are aligned function by function, and a combination of prohibition items is expressed. Columns D to H indicate sheet types, columns I to K indicate sheet sizes, columns L to T indicate stapling positions, columns U to Y indicate punching positions, a column Z indicates a two-sided setting, and a column AA indicates a cover sheet setting. For example, in the prohibition condition for the management number 1, functions of the sheet size A5 and the two-sided printing are "True" and other functions are "False". Accordingly, it is indicated that a combination of the sheet size A5 and the two-sided printing is the prohibition condition and cannot be processed by the printing apparatus 101.

An IPP print service capability DB 318 stores a capability of each of the IPP print services. The capability includes, for example, a sheet type that is supported by a specific IPP print service as a job setting. A prohibition condition list 320 manages subset information of each of the IPP print services of the prohibition information included in the prohibition condition DB 319. The IPP print service includes a Web application that provides a printing function to be called by using a HyperText Transfer Protocol (HTTP) protocol. The prohibition information included in the prohibition condition list 320 is generated, for example, for each of the IPP print services that is enabled at the time of start-up. In an example, a service may be enabled if the service is made able, available, or ready to be engaged or used such as by being permitted or allowed to be used. In another example, a service may be disabled if the service is made unable, unavailable, or not ready to be engaged or used such as by not being permitted or allowed to be used. The generated prohibition information is used for prohibition determination in a case where a print job is executed using the IPP print service. Alternatively, in a case where the information processing apparatus makes an acquisition request of the prohibition information, the generated prohibition information is returned as prohibition information corresponding to the IPP print service for the information processing apparatus. Alternatively, the prohibition condition list 320 is generated when a specific IPP print service is enabled or disabled by a user or an administrator using a user interface illustrated in FIG. 6. At that time, a plurality of prohibition condition lists 320 each corresponding to the enabled IPP print service can be generated. In addition, the prohibition condition list 320 may not be generated for the disabled IPP print service.

Subsequently, there are described a setting method for enabling each of the IPP print services and a flow in which the information processing apparatus obtains the prohibition information by accessing the enabled IPP print service and inputs a print job.

Figure 6:
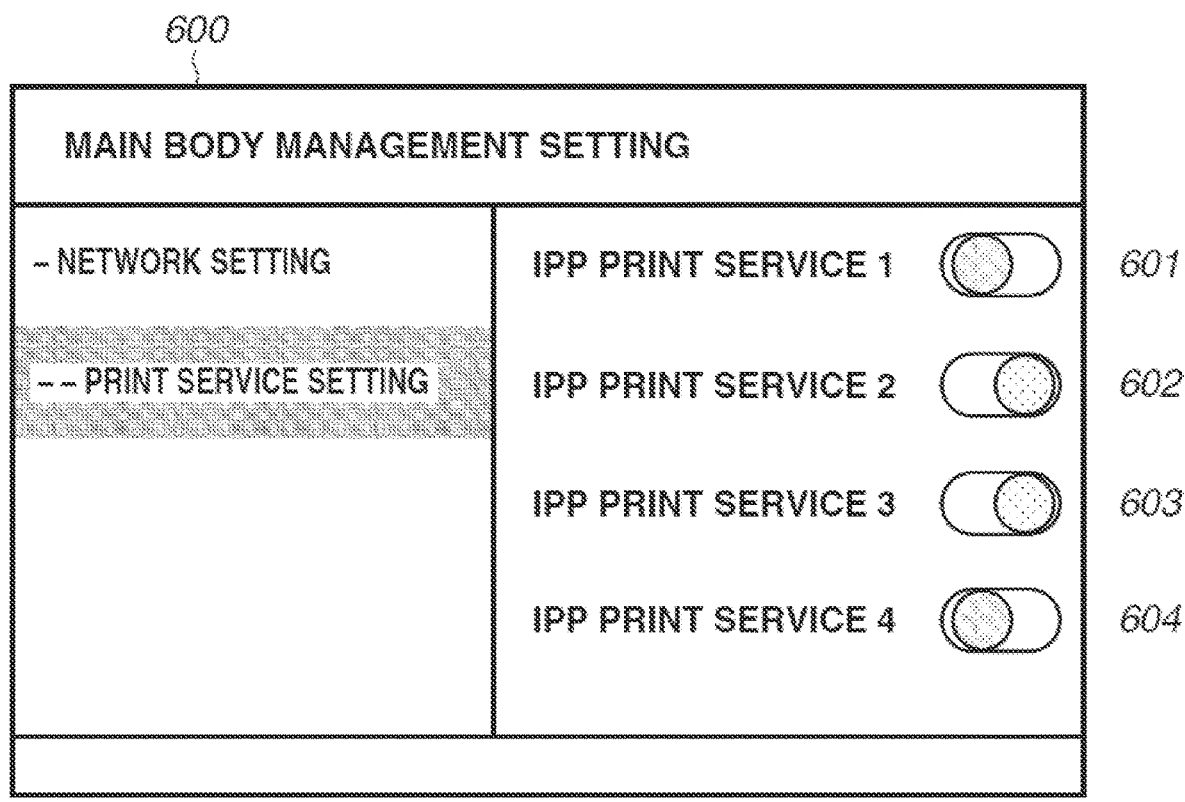
FIG. 6 is a diagram illustrating an example of a screen for managing a print service in the printing apparatus.

First, FIG. 6 will be described. FIG. 6 is a diagram illustrating a main body management setting screen 600 displayed on the operation unit 216 of the printing apparatus 101, and an administrator of the printing apparatus 101 operates ON/OFF on the screen 600 to set which IPP print service to enable. The printing apparatus 101 starts up or terminates four IPP print services 601 to 604 at the time of turning on a power source or changing a setting. In addition, as illustrated in FIGS. 9A and 9B, each of the IPP print services 601 to 604 includes a different prohibition table corresponding to a specification of the print client. The screen 600 in FIG. 6 is controlled by a user interface (UI) control unit 301 and displayed on the operation unit 216. A setting value based on ON/OFF indicating whether to enable the IPP print service and that is input by the administrator of the printing apparatus 101 via the operation unit 216 is stored in the ROM 212 in FIG. 2.

FIG. 17 is a table illustrating a list of the IPP print services and a sorting measure thereof, i.e., how to access the service, and whether the service supports a search. Information in a column of "DETAIL OF SORTING MEASURE OF IPP PRINT SERVICES" indicates a Uniform Resource Locator (URL) and a port number used by the information processing apparatus to access each of the IPP print services and user agent information of the information processing apparatus. Information in a column of "SUPPORT OF SEARCH" indicates whether each of the IPP print services supports a search for the printing apparatus by using multicast Domain Name System (mDNS).

The print service enabled on the setting screen in FIG. 6 operates in the printing apparatus 101 and can be accessed from the information processing apparatus using the accessing method in FIG. 17. The information processing apparatus includes the mobile terminals and PCs 103, 104, and 105 illustrated in FIG. 1.

Figure 7A:
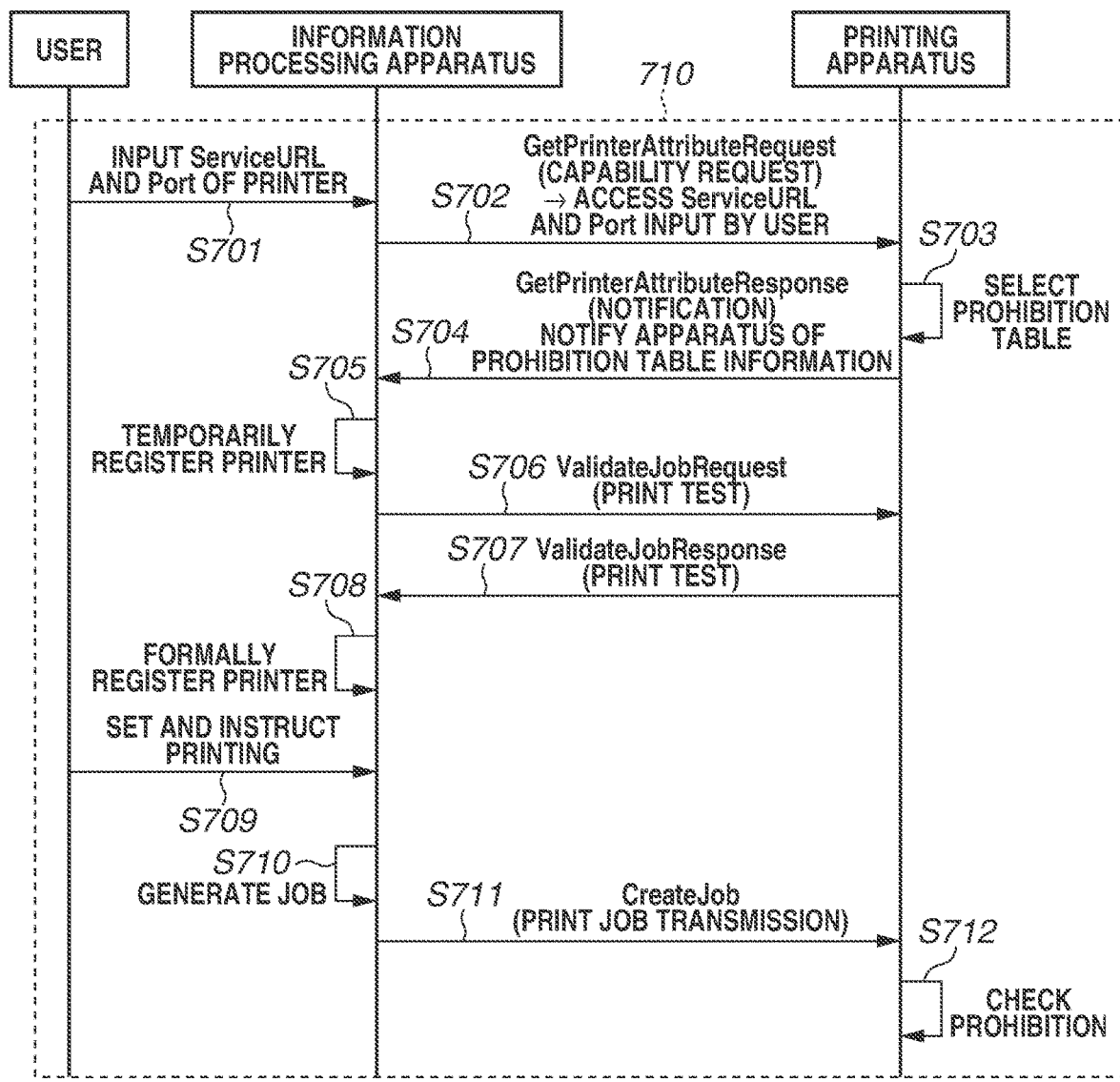
FIG. 7A is a diagram illustrating an example of a communication sequence between the printing apparatus and an information processing apparatus.
Figure 7B:
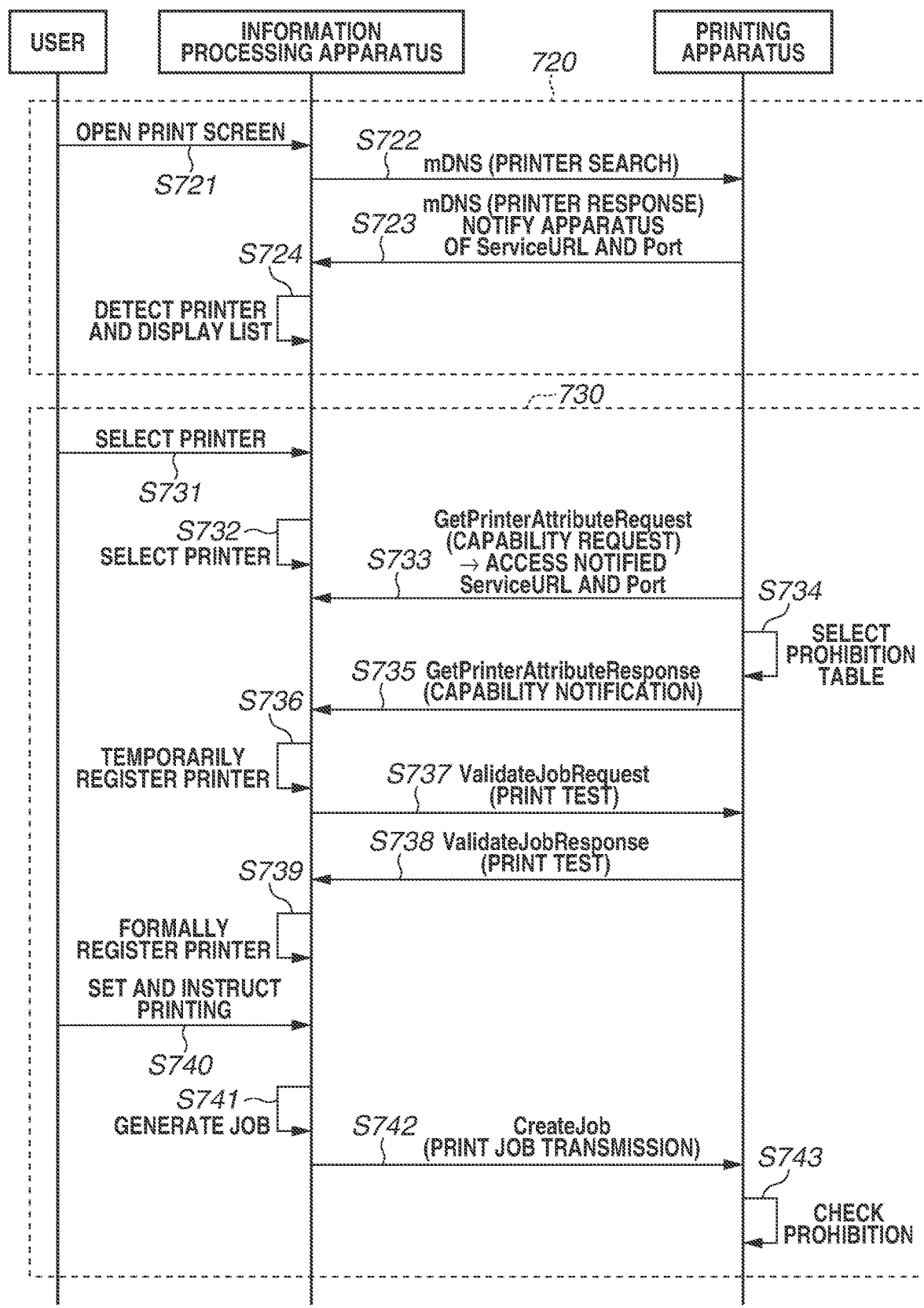
FIG. 7B is a diagram illustrating an example of another communication sequence between the printing apparatus and the information processing apparatus.

FIGS. 7A and 7B are diagrams illustrating operations of the information processing apparatus in a case where the print service is enabled. FIGS. 7A and 7B illustrate that the information processing apparatus inquires of the printing apparatus 101 about capability information and is notified of the prohibition information of each the print services as a response to the inquiry. FIGS. 7A and 7B further illustrate processing from generation of a job based on the prohibition information to transmission of the job performed by the information processing apparatus.

There are two patterns, FIG. 7A illustrates a case of "IPP print service 1" that does not include a measure for searching the printing apparatus by using the mDNS, and FIG. 7B illustrates a case of "IPP print services 2 to 4" that perform a search for the printing apparatus by using the mDNS and registers the printing apparatus based on a search result. The printing apparatus specifies a type of the print service requested by the information processing apparatus based on a listen port number of the print service and the user agent information of the information processing apparatus, and refers to a prohibition table suitable for each of the print services.

FIG. 7A will be described. The IPP print service 1 does not have a function of searching the printing apparatus, so that, in step S701, a user inputs the URL and the port number of the IPP print service provided by the printing apparatus to the information processing apparatus. In step S702, the information processing apparatus directly accesses the designated URL and port number. In step S703, the printing apparatus specifies the print service from the URL and the port number of an access destination and generates a prohibition table for the IPP print service 1. Next, in step S704, the printing apparatus notifies the information processing apparatus of the generated prohibition information. In step S705, the information processing apparatus temporarily registers the printing apparatus. In steps S706 and S707, the information processing apparatus checks with the temporarily registered printer whether a job can be transmitted thereto. In a case where it is determined that a job can be transmitted, in step S708, the information processing apparatus formally registers the printer. Further, in steps S709 and S710, based on an instruction from the user, the information processing apparatus generates a print job based on the prohibition information notified in step S704 and, in step S711, transmits the print job. In step S712, the printing apparatus performs prohibition determination again based on the prohibition table same as that in steps S703 and S704 and performs printing without change if there is no issue.

FIG. 7B will be described. The IPP print services 2 to 4 have the function of searching the printing apparatus. Thus, the sequence is divided into a search processing part 720 and a printer registration and printing part 730. In step S721, a user of the IPP print services 2 to 4 opens a print screen on the information processing apparatus. Opening of the print screen is associated with a printer search request by using the mDNS in step S722 made by the information processing apparatus to the printing apparatus on the same network. In step S723, the printing apparatus notifies the information processing apparatus of the service URL and the port of the IPP print service in a response by using the mDNS. In step S724, the information processing apparatus displays a list of all of the printing apparatuses that have responded thereto. Next, in step S731, the user selects one printing apparatus from among the printers displayed in the list. In steps S732 and S733, the information processing apparatus inquires about the capability information of the printing apparatus based on the selection result by the user. In step S734, the printing apparatus specifies the print service requested by the information processing apparatus from the service URL, the port number, and the user agent information, and generates prohibition information suitable for the print service. In step S735, the printing apparatus registers the prohibition information in the information processing apparatus. Processing in steps S736 to S743 is similar to that in steps S705 to S712, and descriptions thereof are omitted.

Figure 8:
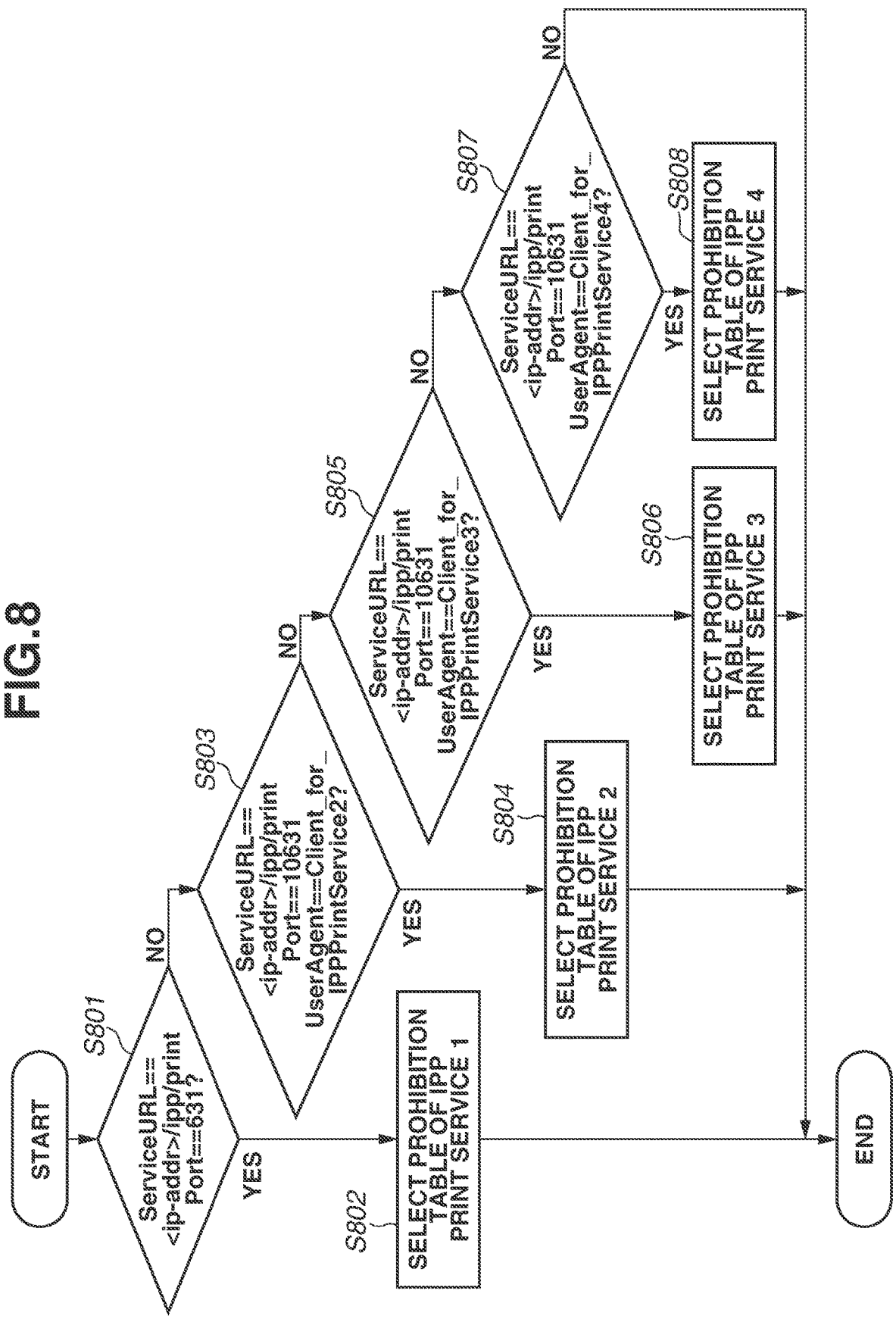
FIG. 8 is a diagram illustrating an example of switching processing for prohibition information notification of the printing apparatus.

FIG. 8 will be described. Processing illustrated in FIG. 8 is implemented by an IPP print service control unit 315 in FIG. 3 causing the CPU 211 of the printing apparatus 101 to execute the processing. A flowchart in FIG. 8 is a flowchart for table selection processing in response to a prohibition table request in steps S703 and S734 and for table selection processing for a prohibition check in printing in steps S712 and S743. A prohibition rule for each of the IPP print services 601 to 604 is generated in advance by a method described below and is stored in the prohibition condition list 320 in FIG. 3.

In step S801, the printing apparatus determines whether the prohibition information for the IPP print service 1 is required from the URL and the port number of the IPP print service. For example, it is possible to determine that the IPP print service is called from a character string "/ipp/print". In addition, whether the IPP print service 1 is called from among the IPP print services can be determined based on the port number. In step S801, in a case where a client calls the IPP print service and a connected port number is 631, it is determined that the IPP print service 1 is called. More specifically, if determination is YES in step S801, in step S802, the prohibition table (FIGS. 11C1 and 11C2) of the IPP print service 1 is selected. The prohibition table is part of the prohibition condition list 320. If the determination is NO in step S801, in step S803, it is determined whether the IPP print service 2 is called from the URL and the port number of the print service and the user agent information of an access source. More specifically, in a case where the character string "/IPP/print" is included in the service URL and the port number is 10631, the user agent information, which is obtained from the client, is further referred to so as to check a character string included therein. In other words, it is determined whether the IPP print service 2 is called. As a result, if determination is YES in step S803, in step S804, the prohibition information for the IPP print service 2 is selected.

If the determination is NO in step S803, then the processing proceeds to step S805. The similar processing is performed in step S805. In step S805, similar to step S803, it is determined whether the prohibition information for the IPP print service 3 is required from the URL and the port number of the print service and the user agent information of the access source. If a determination result is YES in step S805, in step S806, the prohibition information for the IPP print service 3 is selected. If the determination result is NO in step S805, in step S807, it is determined whether the prohibition information for the IPP print service 4 is required from the URL and the port number of the print service and the user agent information of the access source. If a determination result is YES in step S807, in step S808, the prohibition information for the IPP print service 4 is selected. If the determination result is NO in step S807, the prohibition table is not selected.

The accessing method and the selection of the prohibition information corresponding to each of the IPP print services and the example of printing flow have been described above. Subsequently, a generation method of the prohibition information corresponding to each of the IPP print services will be described in detail.

The prohibition condition list to be generated for each of the IPP print services is described with reference to FIGS. 9A to 16C2. As described above, FIGS. 9A and 9B are tables illustrating the prohibition conditions of the printing apparatus, and the relevant information is stored in the prohibition condition DB 319. FIG. 10 is a support function table of the printing apparatus and the IPP print services, and the relevant information is stored in the IPP print service capability DB 318. FIGS. 11A to 11C2, 13A to 13C2, 15A to 15D2, and 16A to 16C2 described below illustrate the prohibition information of each of the IPP print services, and the prohibition information is generated and stored in the prohibition condition list 320.

A method for generating the prohibition table of the IPP print service 1 by the printing apparatus is described with reference to FIGS. 11A to 11C2. FIG. 11A is a table obtained by extracting capabilities of the IPP print service 1 from the table in FIG. 10. Tables in FIGS. 11B1 and 11B2 are obtained by deleting the prohibition information corresponding to capabilities not supported by the IPP print service 1 based on the information in FIGS. 9A, 9B, and 11A. Further, tables in FIGS. 11C1 and 11C2 are obtained by organizing rows in the tables in FIGS. 11B1 and 11B2 so as to be easily viewable. Prohibitions of the sheet types and the sheet size A3, which are the non-supported capabilities, are deleted. In other words, items with X marks in FIG. 11A are deleted from FIGS. 11B1 and 11B2. The printing apparatus generates the prohibition table (FIGS. 11B1 and 11B2)

corresponding to the IPP print service 1 based on the prohibition condition DB 319 (FIGS. 9A and 9B) and stores the prohibition table in the prohibition condition list 320, for example, at the time of start-up and in a case where a change in a UI operation is detected during start-up of the apparatus in FIG. 6.

FIG. 12 is a mapping table of the sheet types of the IPP print service 2 and the sheet types of a printing apparatus main body. Both of the sheet types include setting values "ANY" and "THICK PAPER" in the setting items. Thus, the items are mapped as they are. However, regarding the plain paper, the IPP print service 2 includes only the plain paper while the printing apparatus includes plain papers 1, 2, and 3. Thus, one-to-one mapping is not attained. In the example in FIG. 12, the plain paper in the IPP sheet type is mapped onto the plain paper 1 in the sheet type of the printing apparatus main body.

More specifically, the table represents that, in a case where the plain paper is designated as the sheet type in the IPP sheet type, the printing apparatus handles "plain paper 1" as being designated.

Figure 13C2:
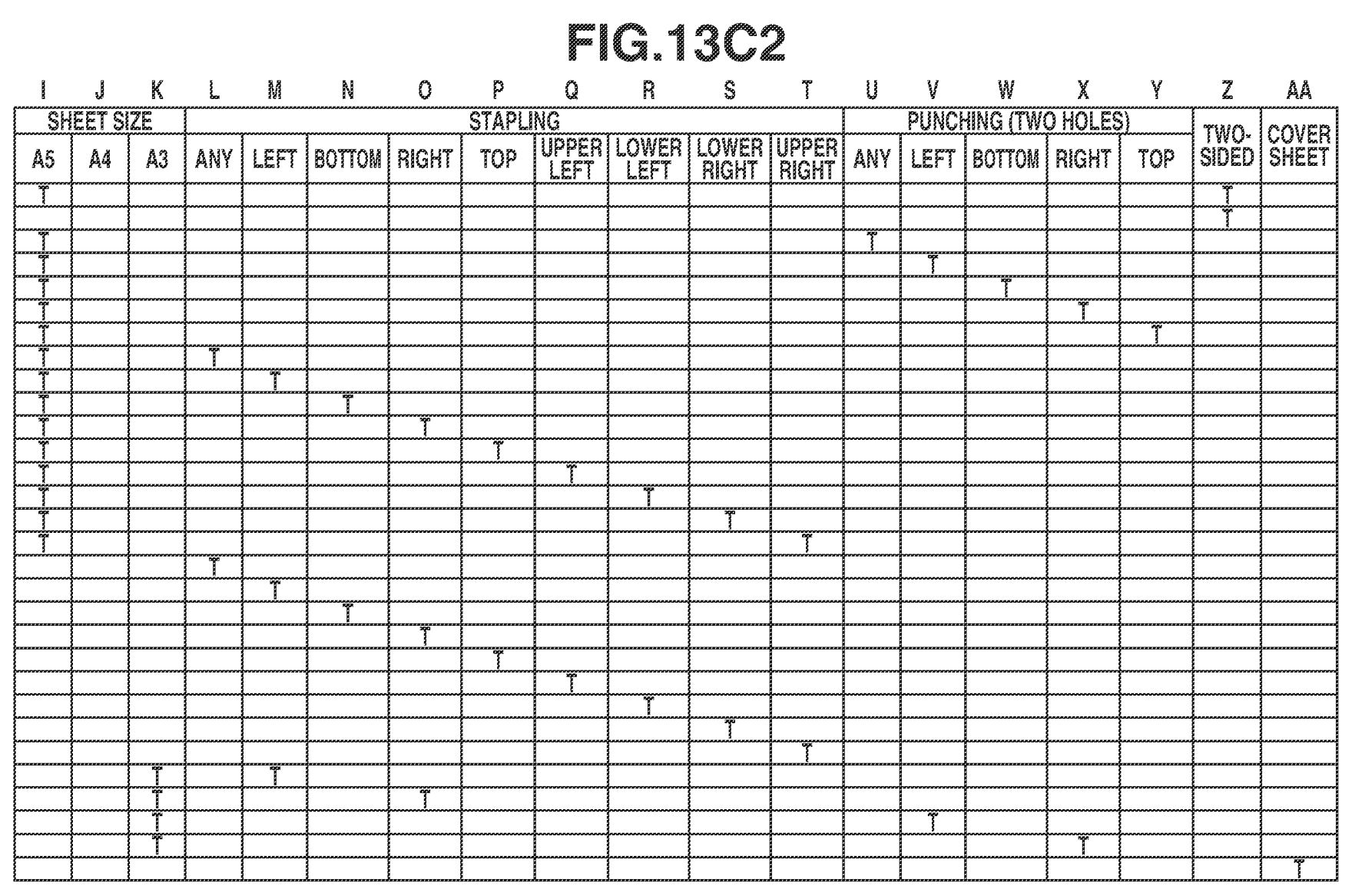

A method for generating the prohibition conditions of the IPP print service 2 by the printing apparatus is described with reference to FIGS. 13A to 13C2. FIG. 13A is a table obtained by extracting capabilities of the IPP print service 2 from the table in FIG. 10.

The printing apparatus generates the prohibition conditions of the IPP print service 2 based on the information in FIGS. 9A, 9B, 12, and 13A. Deletion of the prohibition information for capabilities not supported by the IPP print service 2 is tried based on the information in FIGS. 9A, 9B, and 13A. However, there is no corresponding prohibition information in this example, whereby illustration is omitted (deletion is not performed). Tables in FIGS. 13B1 and 13B2 are obtained by deleting unnecessary prohibition information by applying the capability correspondence information in FIG. 12. In FIGS. 13B1 and 13B2, the prohibitions of the plain paper 1 existing in FIGS. 9A and 9B are changed to the prohibitions of the plain paper, and the prohibitions of the plain papers 2 and 3 are omitted. This is because the plain paper in the IPP sheet type is mapped onto the plain paper 1 in the sheet type of the printing apparatus main body as in FIG. 12. Further, tables in FIGS. 13C1 and 13C2 are obtained by organizing rows in the tables in FIGS. 13B1 and 13B2 so as to be easily viewable.

Subsequently, FIG. 14 is a mapping table of the sheet types of the IPP print services 3 and 4 and the sheet types of the printing apparatus main body. In FIG. 14, the plain paper in the IPP print services 3 and 4 is mapped onto a plurality of sheet types, i.e., the plain paper 1, 2, and 3 in the printing apparatus main body. In other words, the table represents that, in a case where the plain paper is set in the IPP print services 3 and 4, any of the plain paper 1, 2, and 3 is used.

A method for generating the prohibition conditions of the IPP print service 3 by the printing apparatus is described with reference to FIGS. 15A to 15D2. FIGS. 15A to 15D2 illustrate an example of generating the prohibition conditions for the plain paper using OR conditions of the prohibitions of the plain paper 1, 2, and 3, i.e., a method for limiting printing as an example of the prohibition conditions of the IPP print service 3.

FIG. 15A is a table obtained by extracting the capabilities of the IPP print service 3 from the table in FIG. 10.

The printing apparatus generates the prohibition conditions of the IPP print service 3 based on the information in FIGS. 9A, 9B, 14, and 15A.

Figure 15B2:
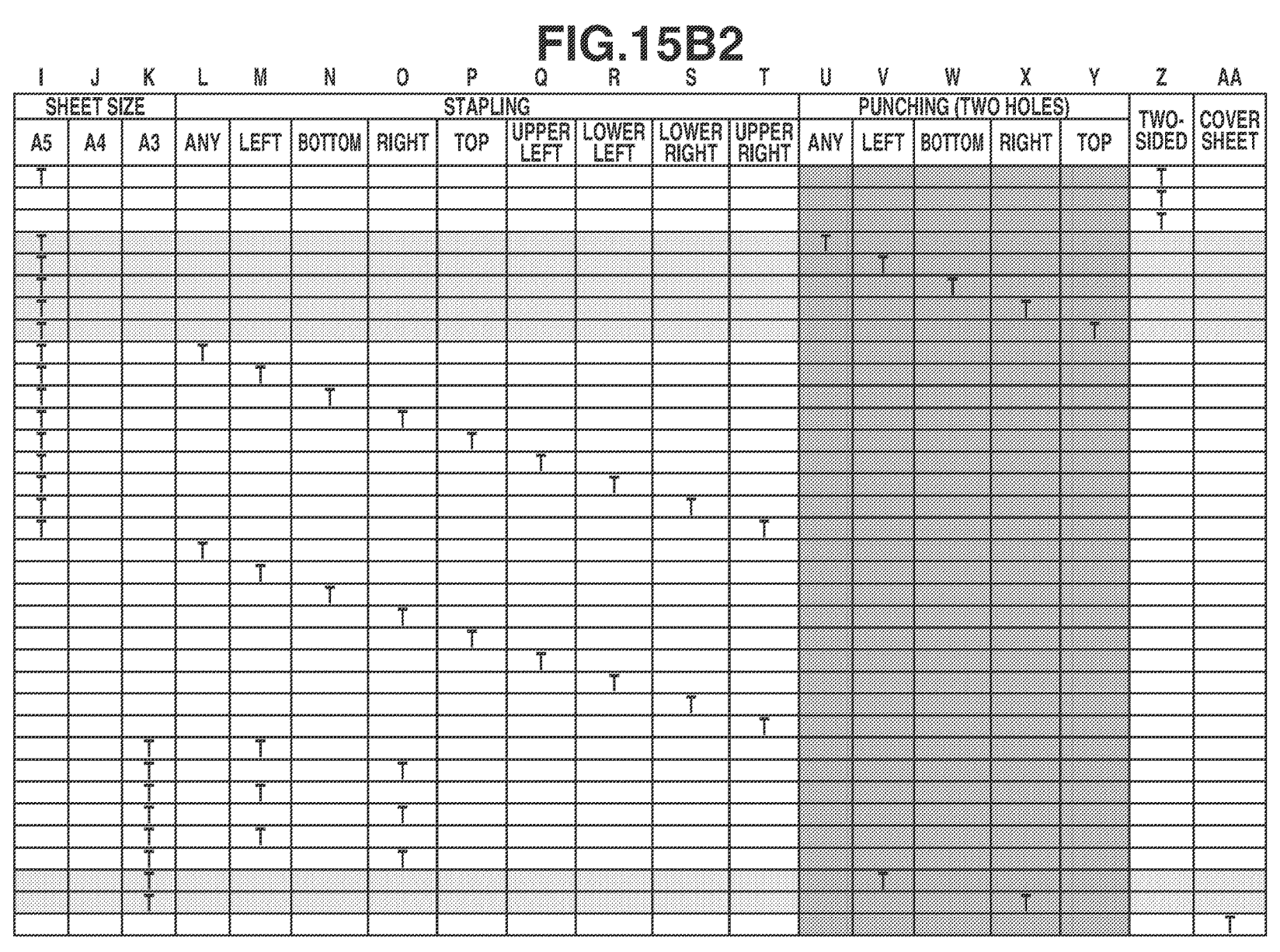

Tables in FIGS. 15B1 and 15B2 are obtained by deleting the prohibition information corresponding to capabilities not supported by the IPP print service 3 based on the information in FIGS. 9A, 9B, and 15A. In FIGS. 15B 1 and 15B2, prohibitions regarding the punching existing in FIG. 9B are omitted. This is because the IPP print service 3 does not support the punching as in FIG. 15A.

Tables in FIGS. 15C1 and 15C2 are obtained by applying the capability correspondence information in FIG. 14 to the tables in FIGS. 15B1 and 15B2 and marking duplication of the prohibition information. In FIGS. 15C1 and 15C2, the prohibitions for the plain paper 1, 2, and 3 are changed to the prohibitions for the plain paper. In other words, a logical OR operation of the prohibitions for the plain paper 1, 2, and 3 is presented as the prohibitions of "plain paper". Accordingly, in a case where the plain paper is set as a print job setting of the IPP print service 3, printing can be performed on a sheet conforming to the sheet type of any of the plain paper 1, 2, and 3 in the printing apparatus main body as long as the sheet does not meet the prohibition condition. In other words, it is designed not to cause an error in the printing apparatus if a sheet that is any of the plain paper 1, 2, and 3 is fed when "plain paper" is set. Tables in FIGS. 15D1 and 15D2 are obtained by organizing rows in the tables in FIGS. 15C1 and 15C2 so as to be easily viewable.

A method for generating the prohibition conditions of the IPP print service 4 by the printing apparatus is described with reference to FIGS. 16A to 16C2. FIGS. 16A to 16C2 illustrate an example of generating the prohibition conditions for the plain paper using AND conditions of the prohibitions of the plain paper 1, 2, and 3, i.e., a method for loosening the limitation of printing.

FIG. 16A is a table obtained by extracting capabilities of the IPP print service 4 from the table in FIG. 10.

The printing apparatus generates the prohibition conditions of the IPP print service 4 based on the information in FIGS. 9A, 9B, 14, and 16A.

Tables in FIGS. 16B1 and 16B2 are obtained by deleting the prohibition information corresponding to capabilities not supported by the IPP print service 4 based on the information in FIGS. 9A, 9B, and 16A. In FIG. 16B2, prohibitions regarding stapling existing in FIG. 9B are omitted. This is because the IPP print service 4 does not support stapling as in FIG. 16A.

Tables in FIGS. 16C1 and 16C2 are obtained by applying the capability correspondence information in FIG. 14 to the tables in FIGS. 16B1 and 16B2. In FIGS. 16C1 and 16C2, only common prohibitions among the prohibitions for the plain paper 1, 2, and 3 existing in FIG. 9A are changed to the prohibitions of the plain paper. On the other hand, a condition that is not the prohibition for any one of the plain paper 1, 2, and 3 is not regarded as the prohibition condition of the plain paper. Accordingly, a range of print settings that can be input to the IPP print service 4 is widened.

The above-described generation processing can be performed on all of the print services supported by the printing apparatus at the time of start-up of the printing apparatus. In this case, the prohibition table can be generated for the print service that is enabled from among the print services 601 to 604 in FIG. 6 while not generating the prohibition table for the print service that is not enabled. In addition, it is also possible to generate the prohibition table for the print service that is enabled from among the print services 601 to 604 in FIG. 6 while not generating the prohibition table for the print service that is not enabled in response to a setting change in FIG. 6.

Alternatively, the generation processing can be executed before shipping of the printing apparatus, and only necessary prohibition tables can be stored in the prohibition condition list 320.

A group of prohibition tables generated as described above is stored in the prohibition condition list 320 in FIG. 3. Further, the prohibition table is used in any of steps S802, S804, S806, and S808 depending on the processing in FIG. 8.

Upon receiving a print job from the information processing apparatus, the IPP print service control unit 315 transmits the print job to a print job generation unit 302. Further, the IPP print service control unit 315 transmits print job setting information to a job setting storage and verification unit 303.

The job setting storage and verification unit 303 verifies a print setting of the print job at the time when the IPP print job is input in response to an IPP print request from the information processing apparatus. Setting verification processing at the time when the print job is input uses the prohibition condition corresponding to the input print job from among the prohibition conditions in the prohibition condition list 320.

A job control unit 307 includes a prohibition determination unit 321. The prohibition determination unit 321 monitors a setting value stored in a job attribute storage unit 308 and a page attribute storage unit 311 during print processing, and verifies whether each parameter satisfies the conditions in the prohibition condition DB 319. In a case where the parameter does not satisfy the conditions in the prohibition condition DB 319, the print processing is interrupted.

The UI control unit 301 obtains information about a status of the print job being processed from the job control unit 307 and displays a processing status of the print job on the operation unit 216.

The print job generation unit 302 receives an IPP print job from the information processing apparatus via the IPP print service control unit 315, registers the IPP print job in the job control unit 307 as a new job while writing drawing data to a data reception control unit 305, and requests a start of print processing. Further, the print job generation unit 302 transmits print setting information to be applied to the print job to the job attribute storage unit 308 via the job setting storage and verification unit 303.

The data reception control unit 305 is a buffer area of the print job received by the print job generation unit 302 and temporarily stores each print job in the storage 214. The job control unit 307 instructs a page description language (PDL) analysis unit 306 to perform PDL analysis processing on the print job, and the PDL analysis unit 306 requests the print job from the data reception control unit 305. Accordingly, the data reception control unit 305 transmits data of the print job to the PDL analysis unit 306.

The job control unit 307 instructs the PDL analysis unit 306 to analyze the print job. Regarding page data generated by the PDL analysis unit 306, a page control unit 309 stores image data in a page storage unit 310 and page attribute information in the page attribute storage unit 311.

The job attribute storage unit 308 stores attribute information of the print job. The attribute information is set as an IPP job attribute and a document attribute such as "number of copies", "printing side (one-sided/two-sided) setting", and "finishing setting".

The page control unit 309 controls page analysis processing performed by the PDL analysis unit 306, RIP processing performed by a RIP control unit 313, and print control processing performed by a print control unit 312. The print control unit 312 obtains RIP-processed image data from the page storage unit 310, performs color separation into cyan, magenta, yellow, and black (CMYK) on the image data, and transfers the image data to an engine control unit 314. The engine control unit 314 receives the image data of the respective CMYK colors page by page from the print control unit 312 and controls the printing unit 220 to perform print processing of each page.

Figure 4:
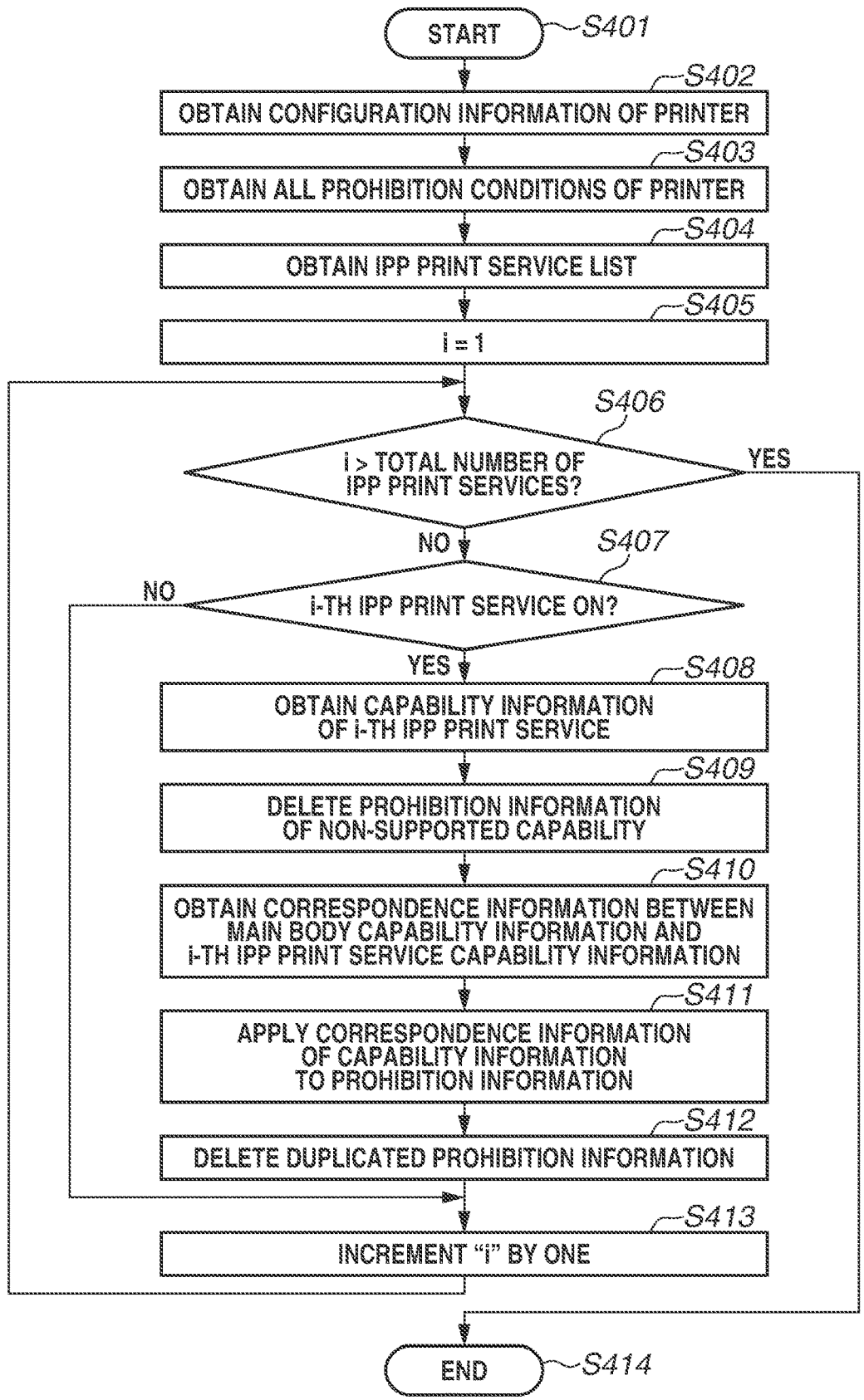
FIG. 4 is a flowchart illustrating generation of an example of prohibition information by the printing apparatus.

FIG. 4 is a flowchart illustrating generation of the prohibition conditions for each of the IPP print services by the printing apparatus. A program related to the processing illustrated in the present flowchart is controlled by the CPU 211 of the control unit 210 successively reading out the program stored in the ROM 212 and the storage 214 to the RAM 213 and executing the program.

In step S401, prohibition condition generation processing is started. A trigger of the start is, for example, the start-up of the printing apparatus. In step S402, configuration information of the printing apparatus is obtained. In step S403, all of the prohibition conditions of the printing apparatus are obtained. All of the prohibition conditions of the printing apparatus are, for example, included in the above-described FIGS. 9A and 9B. In step S404, an IPP print service list is obtained. In step S405, a variable i indicating a number of the IPP print service that is currently being processed is initialized to 1. In step S406, it is determined whether processing is completed on all of the IPP print services. In a case where the processing is not completed (NO in step S406), the processing proceeds to step S407. In a case where the processing is completed (YES in step S406), the processing proceeds to step S414 and is terminated. In step S407, it is determined whether an i-th IPP print service is enabled in the printing apparatus. In a case where the i-th IPP print service is enabled (YES in step S407), the processing proceeds to step S408. In a case where the i-th IPP print service is disabled (NO in step S407), the processing proceeds to step S413. In step S408, capability information of the i-th IPP print service is obtained. The capability information is, for example, support function information and the like in the above-described FIG. 10. In step S409, the prohibition information of the capability not supported by the i-th IPP print service is deleted. Examples of deletion are illustrated in the above-described FIGS. 11B1, 11B2, 15B1, 15B2, 16B1, and 16B2, and the deletion is performed by the method described above with reference to each of the tables. In step S410, correspondence information between the capability information of the printing apparatus main body and the capability information of the i-th IPP print service is obtained. The correspondence information is, for example, the information in the above-described FIGS. 12 and 14. In step S411, the correspondence information of the capability information obtained in step S410 is applied to the prohibition information. Examples of application are illustrated in the above-described FIGS. 13B1, 13B2, 15C1, 15C2, 16C1, and 16C2, and the application is performed by the method described above with reference to each of the tables. In step S412, the prohibition information for the i-th IPP print service is generated by deleting duplication of the prohibition information. The prohibition information from which the duplication is deleted is illustrated in, for example, the above-described FIGS. 13B1, 13B2, 15C1, and 15C2, and the deletion of the duplication is performed by the method described above with reference to each of the tables.

FIG. 5 is an example of an IPP communication message exchanged between the information processing apparatus and the printing apparatus.

A message 501 is an example of a message from the information processing apparatus inquiring a print capability of the printing apparatus. The message includes header information of an HTTP layer and IPP message data of HTTP. A character string 503 indicates user agent information set by an IPP-Client of the information processing apparatus. The character string 503 is used in a case where the printing apparatus determines which IPP print service is to be used by the IPP-Client.

A message 502 is an example of the prohibition information to be notified by the printing apparatus to the information processing apparatus as a response to the message 501. A character string 504 is the prohibition information notified to the information processing apparatus, and a plurality of prohibition rules are described therein. The prohibition information is information for the IPP print service determined based on the character string 503 among the prohibition information of IPP print services generated by the processing in the flowchart illustrated in FIG. 4. In this example, two-sided print of an A5 sheet is prohibited. This is the prohibition condition of the management number 1 in FIG. 9B.

As described above, in the present embodiment, the printing apparatus narrows down the prohibition condition for each of the print services from among the prohibition information stored in the printing apparatus, and uses the prohibition condition as the prohibition in a case where a print job is executed or as the prohibition condition to be transmitted to the information processing apparatus. Accordingly, appropriate prohibition processing can be performed on a print job from each of the print services.

The printing apparatus 101 that communicates with a mobile terminal and a PC (hereinafter referred to as the mobile terminal), which are examples of the information processing apparatus, has been described. The printing apparatus 101 is an example of an image forming apparatus.

The printing apparatus 101 receives information for identifying the print service included in the mobile terminal including a tablet 103. The CPU 211 is an example of a computer.

The printing apparatus 101 transmits, to the mobile terminal, the prohibition condition representing a condition relating to the print setting that cannot be set depending on capabilities of the printing apparatus 101 and of the print setting. The printing apparatus 101 transmits the prohibition condition for the print service corresponding to the received information to the mobile terminal. The IPP services 1 to 4 are described as examples of the print services. The prohibition table stored in the prohibition condition list 320 is described as an example of the prohibition conditions. The prohibition table and the prohibition condition list are prepared for each of the print services. Besides, the prohibition condition suitable for the print service enabled in the printing apparatus 101 that is instructed on the screen illustrated in FIG. 6 may also be generated. It is the CPU 211 that generates the prohibition condition.

The prohibition condition suitable for the print service enabled in the printing apparatus 101 is generated. The prohibition condition suitable for the print service that is not enabled in the printing apparatus 101 may not be generated.

In a case where a specific capability of the print service corresponds to a plurality of capabilities and the prohibition condition is different among the plurality of capabilities, the prohibition conditions may be included in the prohibition condition suitable for the print service.

Further, in a case where a specific capability of the print service corresponds to a plurality of capabilities and the prohibition condition is different among the plurality of capabilities, the different prohibition condition may not be included in the prohibition condition suitable for the print service.

Further, the CPU 211 may generate the prohibition conditions for a plurality of print services in response to start-up. At the time of start-up refers to, for example, a period during which a system of the image forming apparatus performs start-up processing in response to turning on the power source or a period within a predetermined time length after the start-up processing.

In the present embodiment, in a case where printing is performed from a mobile terminal via a general print service such as IPP, prohibition processing corresponding to the printing apparatus and the print service can be performed.

The present disclosure is not limited to the above-described embodiment and can be changed or modified in various ways without departing from the scope of the present disclosure.

According to an aspect of the present embodiment, a print environment corresponding to various print services can be constructed.

According to another aspect of the present embodiment, in a case where a conflict of print settings occurs in various print services, a situation can be handled.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

What is claimed is:

1. An image forming apparatus which is able to communicate with an information processing apparatus via a network, the image forming apparatus comprising:

one or more processors; and
at least one memory storing executable instructions, which when executed by the one or more processors, cause the image forming apparatus to perform operations comprising:
obtaining a list of Internet Printing Protocol (IPP) services including a first type of IPP service and a second type of IPP service;
generating first prohibition information indicating a first combination of setting values prohibited from being set together for a print job to be executed by the first type of IPP service, the first combination of setting values being supported by the first type of IPP service;
generating second prohibition information indicating a second combination of setting values prohibited from being set together for a print job to be executed by the second type of IPP service, the second combination of setting values being supported by the second type of IPP service;
receiving information from the information processing apparatus;
in a case where the information received from the information processing apparatus is first information used for identifying the first type of IPP service, transmitting, to the information processing apparatus, the first prohibition information;
in a case where the information received from the information processing apparatus is second information used for identifying the second type of IPP service, transmitting, to the information processing apparatus, the second prohibition information;
receiving a print job after the first prohibition information and the second prohibition information are generated; and
determining whether the print job can be executed, wherein, in a case where the print job is to be executed by the first type of IPP service, the determining is performed based on the first prohibition information, and, in a case where the print job is to be executed by the second type of IPP service, the determining is performed based on the second prohibition information,
wherein the first combination of setting values indicated by the first prohibition information does not include a combination of setting values which include a setting value which is not supported by the first type of IPP service,
wherein the second combination of setting values indicated by the second prohibition information does not include a combination of setting values which include a setting value which is not supported by the second type of IPP service, and
wherein the print job is generated in accordance with the first prohibition information in a case where the print job is to be executed by the first type of IPP service, and the print job is generated in accordance with the second prohibition information in a case where the print job is to be executed by the second type of IPP service.

2. The image forming apparatus according to claim 1, wherein the first prohibition information is information indicating a sheet type and sheet processing which cannot be executed by the first type of IPP service on a sheet having the sheet type, and
wherein the second prohibition information is information indicating a sheet type and sheet processing which cannot be executed by the second type of IPP service on a sheet having the sheet type.

3. The image forming apparatus according to claim 1, wherein the first prohibition information is information which is determined based on prohibition information of the image forming apparatus, and prohibition information indicating a function which is not supported by the first type of IPP service, and
wherein the second prohibition information is information which is determined based on prohibition information of the image forming apparatus, and prohibition information indicating a function which is not supported by the second type of IPP service.

4. The image forming apparatus according to claim 1, wherein the first prohibition information is information which is obtained by deleting prohibition information indicating a function which is not supported by the first type of IPP service from the prohibition information of the image forming apparatus, and
wherein the second prohibition information is information which is obtained by deleting prohibition information indicating a function which is not supported by the second type of IPP service from the prohibition information of the image forming apparatus.

5. The image forming apparatus according to claim 1, wherein the information received from the information processing apparatus is user agent information.

6. The image forming apparatus according to claim 1, wherein the first prohibition information and the second prohibition information are generated at a time of start-up of the image forming apparatus.

7. A method for controlling an image forming apparatus which is able to communicate with an information processing apparatus via a network, the method comprising:
obtaining a list of Internet Printing Protocol (IPP) services including a first type of IPP service and a second type of IPP service;
generating first prohibition information indicating a first combination of setting values prohibited from being set together for a print job to be executed by the first type of IPP service, the first combination of setting values being supported by the first type of IPP service;
generating second prohibition information indicating a second combination of setting values prohibited from being set together for a print job to be executed by the second type of IPP service, the second combination of setting values being supported by the second type of IPP service;
receiving information from the information processing apparatus;
in a case where the information received from the information processing apparatus is first information used for identifying the first type of IPP service, transmitting, to the information processing apparatus, the first prohibition information;
in a case where the information received from the information processing apparatus is second information used for identifying the second type of IPP service, transmitting, to the information processing apparatus, the second prohibition information;
receiving a print job after the first prohibition information and the second prohibition information are generated; and
determining whether the print job can be executed, wherein, in a case where the print job is to be executed by the first type of IPP service, the determining is performed based on the first prohibition information, and, in a case where the print job is to be executed by the second type of IPP service, the determining is performed based on the second prohibition information, wherein the first combination of setting values indicated by the first prohibition information does not include a combination of setting values which include a setting value which is not supported by the first type of IPP service, wherein the second combination of setting values indicated by the second prohibition information does not include a combination of setting values which include a setting value which is not supported by the second type of IPP service, and wherein the print job is generated in accordance with the first prohibition information in a case where the print job is to be executed by the first type of IPP service, and the print job is generated in accordance with the second prohibition information in a case where the print job is to be executed by the second type of IPP service.

8. A non-transitory computer-readable storage medium storing one or more programs including instructions, which when executed by one or more processors of an image forming apparatus which is able to communicate with an information processing apparatus via a network, cause the image forming apparatus to perform operations comprising:

obtaining a list of Internet Printing Protocol (IPP) services including a first type of IPP service and a second type of IPP service;

generating first prohibition information indicating a first combination of setting values prohibited from being set together for a print job to be executed by the first type of IPP service, the first combination of setting values being supported by the first type of IPP service;

generating second prohibition information indicating a second combination of setting values prohibited from being set together for a print job to be executed by the second type of IPP service, the second combination of setting values being supported by the second type of IPP service;

receiving information from the information processing apparatus;

in a case where the information received from the information processing apparatus is first information used for identifying the first type of IPP service, transmitting, to the information processing apparatus, the first prohibition information;

in a case where the information received from the information processing apparatus is second information used for identifying the second type of IPP service, transmitting, to the information processing apparatus, the second prohibition information;

receiving a print job after the first prohibition information and the second prohibition information are generated; and determining whether the print job can be executed, wherein, in a case where the print job is to be executed by the first type of IPP service, the determining is performed based on the first prohibition information, and, in a case where the print job is to be executed by the second type of IPP service, the determining is performed based on the second prohibition information, wherein the first combination of setting values indicated by the first prohibition information does not include a combination of setting values which include a setting value which is not supported by the first type of IPP service, wherein the second combination of setting values indicated by the second prohibition information does not include a combination of setting values which include a setting value which is not supported by the second type of IPP service, and wherein the print job is generated in accordance with the first prohibition information in a case where the print job is to be executed by the first type of IPP service, and the print job is generated in accordance with the second prohibition information in a case where the print job is to be executed by the second type of IPP service.

* * * * *